(12) United States Patent
Grune et al.

(10) Patent No.: US 6,490,569 B1
(45) Date of Patent: Dec. 3, 2002

(54) SYSTEM FOR COMBINING LIFE CYCLE ASSESSMENT WITH ACTIVITY BASED COSTING USING A RELATIONAL DATABASE SOFTWARE APPLICATION

(75) Inventors: Carla Owen Grune; Guerry Leonard Grune, both of Virginia Beach, VA (US); Sanjay Sharma, Raleigh, NC (US)

(73) Assignee: KM Ltd., Virginia Beach, VA (US)

( * ) Notice: Subject to any disclaimer, the term of this patent is extended or adjusted under 35 U.S.C. 154(b) by 0 days.

(21) Appl. No.: 09/335,957

(22) Filed: Jun. 18, 1999

Related U.S. Application Data

(60) Provisional application No. 60/090,166, filed on Jun. 22, 1998.

(51) Int. Cl.[7] .......................... G06F 19/00; G46F 17/60; H04L 27/00
(52) U.S. Cl. ............................. 705/400; 705/28; 705/30
(58) Field of Search ........................... 705/400, 28, 10; 707/103

(56) References Cited

U.S. PATENT DOCUMENTS

| | | | | |
|---|---|---|---|---|
| 5,311,437 A | * | 5/1994 | Leal et al. | 364/468 |
| 5,652,708 A | * | 7/1997 | Miyyamoto et al. | 364/468.13 |
| 5,799,286 A | * | 8/1998 | Morgan et al. | 705/30 |
| 5,852,560 A | * | 12/1998 | Takeyama | 364/468.03 |
| 5,878,433 A | * | 3/1999 | Miyamoto | 707/103 |
| 5,970,476 A | * | 10/1999 | Fahey | 705/28 |
| 6,308,166 B1 | * | 10/2001 | Breuker et al. | 705/400 |

FOREIGN PATENT DOCUMENTS

JP 02001125983 A * 5/2001 .......... G06F/17/60

OTHER PUBLICATIONS

Environmental cost accounting: The bottom line for environmental quality management. Russell, William G; Skalak, Steven L; Miller, Gail Total Quality Environnemental Management v3n3 pp.: 255–268 Spring 1994.*

Greening the manufacturing function. (Environmentally conscious manufacturing) Sarkis, Joseph; Rasheed, Abdul Business Horizons, v38, n5, p17 (11) Sep–Oct., 1995.*

* cited by examiner

*Primary Examiner*—James P. Trammell
*Assistant Examiner*—Daniel L Greene
(74) *Attorney, Agent, or Firm*—Pennie & Edmonds LLP; Guerry L. Grune

(57) ABSTRACT

A method for analysis of environmental load burdens and associated costs for products, processes and services, which takes into account both life cycle assessment and activity based costing. The steps entailed in the method include representing the at least one product, process or service as a process hierarchy having at least one elemental component having at least one baseline process associated therewith; associating at least one driver corresponding to the at least one elemental component, with at least one environmental load/substance category; calculating a first metric reflective of an environmental load of providing the at least one product, process or service; and calculating a second metric reflective of a cost of providing the at least one product, processor service.

30 Claims, 45 Drawing Sheets

- Product Selection window

– New Production Information window

- Process Inventory window

– Machine/Line Process window

- Baseline Process window

- Elemental Components window

– Product Inventory window

- Product Selection window for Determination Process

- Product Specification window

– Determination Driver Values window

– Determination Driver Values window

– Valuation Stage window

– Valuation Method window

- Graphical results window

– Graphical results window

- Graphical results window

- Numerical results window

FIGURE 40

– Numerical results window

FIGURE 41

SYSTEM FOR COMBINING LIFE CYCLE ASSESSMENT WITH ACTIVITY BASED COSTING USING A RELATIONAL DATABASE SOFTWARE APPLICATION

This application is based on Provisional application Ser. No. 60/090,166 filed Jun. 22, 1998, the entire contents of which are expressly incorporated by reference.

FIELD OF THE INVENTION

This invention relates generally to the field of Life Cycle Assessment (LCA), and more particularly to a process for combining Life Cycle Assessment (LCA) with Activity Based Costing (ABC) using relational database software. This software program application, referred to herewithin as the LCAPIX module, can be used to determine, by a proactive means, what the environmental burden and associated costs are or may be for current and future products, processes, or services. Specifically, the software utilizes elements normally associated with Activity Based Costing, including drivers, driver values and driver factors for determining the environmental burden using associated valuation for a complete Life Cycle Assessment. Additional uses of the software program application includes providing a means by which an environmental management strategy can be implemented using International Standards Organization (ISO) 14000 guidelines adopted in 1992 for Life Cycle Assessment, and also provides a means for improving eco-efficiency.

DISCUSSION OF THE BACKGROUND

Life Cycle Assessment/Analysis; LCA, can be defined as an objective process to evaluate the environmental burdens associated with a product, process, or service by identifying and quantifying energy and materials used and wastes released to the environment. The assessment includes the entire life cycle, from "cradle-to-grave" of the product, process, or activity, and encompasses the extraction and processing of raw materials, manufacturing, transportation and distribution, use, reuse, maintenance, recycling, and final disposal. A complete Life Cycle Assessment/Analysis is comprised of the following three stages;

(I) The Inventory Analysis, which is an objective quantification of the raw materials, energy requirements, air/water effluents, solid wastes, manufacturing, processing, formulation, distribution and transportation, use/reuse/maintenance, recycling, and other processes and services required within a previously defined system boundary. The LCA Inventory must have scientific basis, be quantitative, appropriately detailed, replicable, comprehensive, broadly applicable, consistent, and peer-reviewed.

(II) Impact Assessment, which is the stage where the Inventory is analyzed for its effect on the environment and includes the following steps:

(1) Classification, defined as the characterization of the inventoried elements (2) Characterization, which is the analysis and quantification of the inventoried elements, and (3) Valuation which is how the data of different specific categories associated with the inventoried elements are weighted and compared for further interpretation.

The valuation data should be subjected to a sensitivity analysis or equivalent analysis to ensure meaningfulness within the scientific and technical community (III) Improvement Assessment, here defined as the systematic evaluation of the needs and opportunities required to reduce an environmental burden. This involves changes in the product design, raw material use, processing, waste management, etc. required to improve the product, process, or service.

This conventional approach to LCA was developed in 1991–1993 by SETAC, the Society of Environmental Toxicology and Chemistry, and then subsequently adopted by the ISO 14000 committee (International Standards Organization) on Environmental Management Systems and as schematically presented in FIG. 2. The arrows associated with FIG. 2 indicate that the "triangle" of (I) inventory, (II) impact analysis, and (III) improvement analysis (or assessment) is a continuous process so that improvement, by reduction of environmental burden, can be accomplished.

Activity based costing, ABC, can be defined as a non-traditional accounting method which encompasses determination of the costs associated with any action that can be performed by a human or machine. Traditional accounting reports generally have little in common with manufacturing results. Activity Based Costing/Management (ABC/M) is a realization that traditional accounting procedures do not empower management to sufficiently identify and reduce costs and wastes. Activity Based Management, ABM, analyzes and utilizes the information supplied by Activity Based Costing to yield continuous improvement strategies and conditions. ABC includes determination of the costs for all products, projects or services associated with an activity so that continuous cost reduction improvement strategies and conditions can be accomplished.

A typical approach to ABC includes the use of drivers, driver factors, and driver values, which are specific to a task or set of tasks associated with the activity that is being reviewed on a cost basis. Once the specific operations are determined, for example welding for the manufacture of a metal box, drivers are developed that would include length of the weld and the time taken to perform the welding operation. The driver units, for example could include inches, for the length of the weld, and minutes for the time taken in welding (as shown in the screen capture of FIG. 11d). Driver values may be estimated or taken directly from the product, process, or service based on the knowledge of the individual performing the task required for the item(s) under analysis.

In the past, the conventional approach to performing LCA or ABC has been either by humans writing "pen and paper" reports that took weeks or months to prepare. These reports were often static in that the data and subsequent analysis could not be easily changed or compared as new or additional information became available. FIG. 1 shows the conventional LCA approach using energy and with raw materials inputs. Assessing effluent outputs completes the major elements of a traditional LCA. With the advent of software and spreadsheet systems such as Excel and Lotus 1,2,3 together with the provision and use of electronic databases, both LCA and ABC studies have been used at an increasing rate because the manpower and costs associated with performing such studies has decreased dramatically.

Within the last 10 years, LCA software programs have been developed to manipulate data within databases and provide valuation results according to the traditional approach shown in FIG. 1, where the data from these LCA software programs is predominately in the form of mass and energy balances including input and output to and from the manufacturing site or within various operations inside the manufacturing site. Likewise, for processes or services, data is provided regarding inputs or influents and outputs or effluents. FIG. 3 is a block diagram depicting the LCA approach for the available software tools existing prior to the present invention. In the conventional approach, using mass and energy balance data, the user provides only the amounts of each inventoried item. The software tool then provides the valuation units (ELU's—environmental load units for example—or other valuation schemes) from a database and the program calculates the total environmental impact. The missing information in this approach is significant, in that several inventoried items required for each process specified by the user, are not included. Dimensions of the product, size of the process equipment, or time required to perform a task are also elements missing from the conventional LCA software program.

In short, there has not been an easy and useful technique to provide for analysis of the product, process or service based on the specific tasks or activities required for each of these items (while also incorporating data from mass and energy balances).

As can now be understood by the foregoing explanation, there has also been no known system for analysis of the manufacture of a product, development of a process, or provision of a service that allows for performing a Life Cycle Assessment in a manner such that an Activity Based Costing approach can also be included. Further, there has been no earlier known inventive concept for combining these two traditional methods from the two uniquely different disciplines of engineering science and accounting and making computer software available such that one who has little or no skill in either discipline could simultaneously or sequentially or at some later time accomplish both an LCA and ABC study. The goal of many businesses, organizations, and individuals exists to rapidly collect meaningful, task-related data for input and generate dynamic graphical reports that would empower management to take appropriate steps to reduce either current or future environmental burdens and simultaneously reduce associated costs. An additional need that exists is for the provision of a relational database that is easily accessed by "user friendly" software such that the same individual who has little or no skill in the traditional engineering and accounting disciplines may provide these same LCA/ABC dynamic graphical reports both accurately and rapidly. Still another need exists to provide such a software system that incorporates all of the foregoing including the combination of ABC with LCA using object-oriented programming with relational databases with data that can continuously be updated and manipulated.

The software should also be network configurable for work-group applications and allow for report generation that is flexible to allow for selecting, rearranging, and graphically presenting results in a variety of ways. Information may have to be presented to senior management for strategic planning or manufacturing facility engineers for product/process improvement or even to a local citizen's action group (CAP) for review of environmental burden(s). The software must be coupled with the relational database and the database should be accessible independent of the rest of the software. Modules or segments should be hierarchical so that the tasks associated with any item can be easily modeled and the drivers and task elements changed as frequently as required.

Object-oriented programs manipulate objects rather than data or text per se. Objects represent collections of items (both data and the functions that operate on those data) and can have information associated with them through address pointers that refer to other objects. For example, a screen object such as a process box, can itself be an information icon on a screen, but it must be linked to other sets of information in the database. When the user "clicks" on the object with a mouse, the software automatically links the screen object with the related information. While such developed software programs have existed for conventional mass and energy balance LCA work, the need remains for software that combines these aforementioned features with the ability to perform simultaneous, sequential, or subsequent LCA/ABC analysis using task oriented drivers.

LCA studies have been considered time consuming, costly and perceived as having little direct value for the manufacturer, process developer, or service provider. Without an immediate and considerable emphasis on current and future associated costs, this reasoning has restricted many known potential manufacturers or businesses, known to be sources of environmental "contamination", to do little or nothing to improve their situation.

Measuring environmental burden or potential environmental burden should also include measuring costs associated with each and every elemental task that causes this burden. Without such a complete method of measurement, important details of prevention and improvement are easily overlooked or omitted. Previous LCA studies and software packages have not or could not adequately provide simultaneous detailed analysis with the speed and accuracy required for immediate action. There has not existed a simple means by which one unskilled or untrained in the separate professions of engineering science and accounting could perform a combined LCA/ABC analysis without considerable knowledge of each of these two demanding disciplines. The capability of one individual with a limited skill set to input data and receive dynamic LCA/ABC valuation reports by making changes in task associated drivers has also not existed. Additionally, the development of a simple hierarchical method for inputting data and associated drivers into a user friendly software program that provides a format so that associated basic elemental tasks can also be included (for any process, product, or service), has also not existed.

SUMMARY OF THE INVENTION

Accordingly, one primary object of this invention is to provide a novel system that merges the key aspects of the combined methodologies used for activity based costing (ABC) and life cycle assessment (LCA) into a an object oriented programmable software application coupled with a relational database. This software application is known and subsequently referred to as the LCAPIX module. The Venn diagram of FIG. 5 illustrates both the initial conceptual merger of these two methods previously used by individuals skilled in either the engineering sciences (LCA) or in the accounting (ABC) disciplines, as well as providing an overall model for the LCAPIX software module of the present invention. The top "platform" of FIG. 5 illustrates that for both LCA and ABC, an inventory stage is required where LCA can be considered a subset of ABC and ABM. One then has a choice as to whether the next procedure will involve determination of costs via the conventional ABC approach or determination and valuation by "environmental load indices" assigned to various activities and objects. In both cases, the evaluation of the inventoried data results in the Impact Assessment Stage (II) according to ISO 14000 practices. These operations may be performed simultaneously using the LCAPIX software module. Finally, the improvement analysis stage (III) is shown to reside on an identical platform, but at some later time, as the inventory stage, again indicating that LCA can be considered a subset of ABC. The improvement analysis stage can be used for environmental and strategic planning of the product, process, or service under analysis.

Another object of the invention is to provide a fast, reliable, dynamic system useful for analysis of a product, process, or service based on specific tasks or activities for each of these items. In performing this analysis, it is possible to combine the heretofore separate analysis of both LCA and ABC into a single format using the developed object oriented programmable software with associated database combined in the LCAPIX software application. The software program application, which is hereafter referred to as the LCAPIX module, was achieved directly from a higher level three dimensional "tree and branching" model by special mapping techniques requiring truncation of the overall hierarchy. The development of a three dimensional model that provides the basis for which a two-dimensional software program application allows for infinite tiers or stages to simulate the product, process, or service under LCA/ABC analysis is also a feature of the present invention.

An additional object of the invention is to provide; a relational database that is easily accessed by "user friendly" software using object oriented or future, not yet developed, software programmed to include relational databases that can be continuously updated and manipulated such that one of little or no skill in the demanding disciplines of engineering science or accounting may receive the ability to simultaneously, sequentially, or at an earlier or later time accomplish both an ABC and LCA study. The present invention also empowers such individuals to collect and input meaningful tasks to the LCAPIX module (related to process, product, or service data). Then dynamic graphical (as well as textual) reports can be generated in order that appropriate steps may be taken to reduce current or future environmental burdens while also assessing associated costs.

Another object of the invention is the development of the LCAPIX software program application that provides for a five tier or stage or greater hierarchy (levels or layers are also acceptable terms) describing any product, process, or service for which a LCA/ABC analysis is desired.

Separate software applications for ABC or LCA are known to exist, but none are known to combine the elements of each by any means. The concept of associating drivers, driver values, and driver factors with environmental burden assessment is a novel feature of this invention required for combining the necessary aspects of LCA with ABC.

The LCAPIX module includes a means by which individual tasks incorporating the elements of time and associated costs for products, processes, or services can be included. FIG. 3 is a block diagram depicting the LCA approach for the available software tools existing prior to the present invention. In the conventional approach, using mass and energy balance data, the user provides only the amounts of each inventoried item. The software tool then provides the valuation units (ELU's—environmental load units for example—or other valuation schemes) from a database and the program calculates the total environmental impact. The missing information in this approach is significant. As provided for in FIG. 4, several inventoried items required for each process specified by the user are now included. Dimensions of the product, size of the process equipment, or time required to perform a task are also included to ensure that no essential tasks are omitted from the analysis. In an ABC analysis this approach is considered conventional and necessary. This approach, however, has not been used for the majority of LCA studies due to the often predetermined (and sometimes incorrect) assumption that only large amounts of mass or energy with associated large scales contribute significantly to the environmental load burden. For LCA studies that did attempt the more detailed approach, as indicated in FIG. 4, no available software existed that could perform the operations as performed by the LCAPIX software module.

Earlier and current LCA software applications allow primarily for energy and mass balance data collection but do not incorporate time related tasks or associated environmental burdens, thereby reducing the effectiveness of LCA studies. For implementing methods to improve Eco-efficiency and reduce production costs, the details of the task-related activities are essential for understanding what and how to make desired changes. The absence of any ABC techniques, further reduces the users ability to enhance Eco-efficiency or reduce the same production costs. In addition, earlier and current software applications were not developed to accommodate the ISO 14000 terminology and also include ABC methodology. Also, earlier and current software applications do not allow for product/process breakdown into elemental components nor do they allow for implementation of drivers and associated driver values. Conversion of LCA impact analysis information into a suitable format (graphical and numerical reports) which allows for rapid strategic comparisons together with ABC details is also novel.

FIG. 6 represents the LCA Product/Process Schema for the LCAPIX software and is a key element used in the approach to combine LCA with ABC to determine both environmental load burdens and associated costs for providing a product, process, or service. The figure shows a 5 stage or level stepwise procedure that can be used to model most common processes involved in product manufacture, processing methods or service provisions. Starting from the top and heading to the bottom (top to bottom analysis is equally effective and provided for in the LCAPIX software module), the user can first indicate the product/process type or name. At all; the remaining levels, data is associated with the level or stage to accomplish this final product, process, or service. Next, at level 2, a machine/ line process can be detailed. This Machine/Line stage could simulate an entire manufacturing portion of an industrial plant production line where one or thousands of widgets are produced daily, weekly, or monthly. At level 3, the subprocess level is provided for where data can be entered regarding some pre-machine line process stage item. At level 4, the operation level is provided for where data can be entered regarding some pre-subprocess stage item. Finally, at level 5, determination of a set of rudimentary tasks associated with the product at stage 1 is possible. The hierarchy described may be truncated at any level for less than 5 stepwise procedure or concatenated with subsequent procedures that can be modeled using 5 or less steps. In this way, a 10, 20, 100, 200, or even 2000 step wise procedure (such as required in producing an automobile or airplane) can be modeled. The flexibility of the model should now be evident in that the product at level 1 (under analysis) could be an entire building or just a desk within that building. Another example is that the product could be the wing of an aircraft or the entire airplane. In each case, the LCAPIX software module is capable of accepting the data for as many of the stages represented in the model hierarchy as required to fully and adequately perform an LCA/ABC analysis.

The LCAPIX module reduces the product, process, or service into 5 or more (or less) separate and distinct stages (including the product name) or levels as also shown in FIG.

7, and allows for completing ABC or LCA studies simultaneously (or individually at an earlier or later time). The relational database or library allows for simple access to stored data that may be associated with any of the levels or stages. Before the reduction of this invention to practice, no known practical hierarchical scheme generically describing a product, process, or service existed such that a useful associated software application combining LCA with ABC could be developed. By first perfecting this hierarchical scheme and subsequently developing the LCAPIX software application incorporating this scheme, LCA/ABC studies that heretofore required weeks or months can now be accomplished in days or even hours. Further, by development of the LCAPIX software module, instead of a group of individuals (or costly consultants) knowledgeable about LCA and ABC and associated engineering science and accounting principles, the requirement to complete an LCA/ABC study can be performed by one individual who is familiar with how the process, product, or service is accomplished. This is a feature that allows for large cost savings in both manhours (labor) and wages.

A main feature that allows for this cost and time reduction is that the LCAPIX module can separate each stage into a baseline process with an associated elemental task. The baseline process, as developed for the LCAPIX module and depicted in FIG. 7 (as well as being described according to the software module in the flowcharts of FIGS. 8–21), is the process below which no other simple operations exist. An elemental component must be associated with a baseline process. The baseline process can be at any level of the 5 (or more) hierarchical layers (from bottom-to-top; task, operation, subprocess, or machine line/process) but not the top layer (always the product name or type—process operation).

Yet another object of the invention is the relational database aspect of the LCAPIX module that allows for inexpensive and rapid access to multiple environmental valuation schemes or associated costs or both, used for various analysis and strategic planning methods.

Still yet another object of the invention is the conversion of LCA impact analysis information into a suitable form (graphical and numerical reports) for inclusion in managerial and executive decision making for the "improvement" portion of the analysis. By incorporating the elements of time and individual tasks, the same analysis can provide the same report with costs in any international currency. The LCAPIX module builds the process hierarchical inventory of industrial and other systems, calculates the process substance amounts, and determines the process substance loads by accessing environmental valuation and cost databases. The LCAPIX module allows for multiple calculations or "cases" which are determined in the analysis stage.

Concurrent valuation and cost considerations are generated using the same inventory, impact assessment and improvement analysis LCA process scheme originally developed by the ISO 14000 committee (SETAC—1992). This allows the user to follow ISO 14000 guidelines in the development of an organizational environmental strategy which provides for more than eventual ISO 14000 Certification, and also yields detailed information on process, product, or service Eco-efficiency improvements.

Summarizing the specific advantages of the LCAPIX software module includes; a system for combining Life Cycle Assessment (LCA) with Activity Based Costing using object oriented relational database software for implementation of an environmental management strategy comprising the steps of:

i). combining Life Cycle Assessment (LCA) with Activity Based Costing (ABC) methodologies by including elemental components defined by drivers, driver units, and driver values or factors and a separate but easily accessible relational database included in an object oriented application software known as the LCAPIX module. The design flow of the LCAPIX module is described in detailed flowcharts FIGS. 8–22.

ii). including a product/process/service schema that allows for reduction and separation of any 5 step (or more or less) hierarchy for any overall process, product, or service into elemental tasks or baseline processes following the schematic representation of the two dimensional model as shown in FIG. 6;

iii). following the recommended guidelines and procedures within ISO 14000 and more specifically ISO 14040 Life Cycle Assessment methodologies for all three stages of Inventory (I), Determination (II), and Improvement (III) analysis;

iv) providing the unique ability to determine costs via ABC and environmental burdens via LCA (using valuation schemes) either simultaneously or at a later or earlier time by understanding the tasks required for making the product or performing the process or service without full comprehension of the underlying engineering science or accounting principles inherent in LCA/ABC studies and generating quick, reliable, comprehensive, dynamic, ABM style reports and graphical charts for immediate management review;

v). using a relational database separate and distinct from the LCAPIX application that allows for rapid comparison of environmental burdens from multiple environmental load centers as well as storing cost data using various forms of currency and allows for continuous updates and manipulation of data;

vi). allowing for breakdown or decomposition of any process, product, or service into elemental components that can be later used to assess different products, processes or services. converting of LCA impact analysis into a suitable form =

This summary does not include all the features of the present invention, but rather it should be understood these represent the preferred embodiments descriptive of the present invention as differentiated from the background of the invention detailed in that section above. Other objects and advantages of the present invention will become apparent from the following descriptions, taken in connection with the accompanying drawings, wherein, by way of illustration and example, an embodiment of the present invention is disclosed.

During development of the actual software program application, inclusion of the LCAPIX module-Powerbuilder application provides a unique interface with Watcom.sql that avoids the necessity for both database code development and C++ object oriented programming. This allows for rapid, complete, and flexible application changes to suit the needs of any current or future potential users of the LCAPIX module.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

FIGS. 24–41 correspond to FIG. 23 and also to FIGS. 8–21 in that they are reproductions of actual screen captures from a very early version of the present invention. The object oriented programming described earlier allows for the user friendly interface shown in these figures and is a large contributor to the fact that the user need not understand LCA or ABC concepts to reap the benefits of the individual or combined analysis. It should be recognized that FIGS. 24–41 are for demonstration purposes only and do not exhibit either the entire hierarchy or capabilities of the LCAPIX software module. It should also be recognized that this is one of several possible sequences that can be accomplished with the LCAPIX software module tool.

FIG. 24 is the Product Selection Window and allows for selection and display of the Product/Process.

FIG. 25 is the New Product Information Window and allows for inputting the product name and description and display.

FIG. 26 is the Process Inventory Window and begins the first step at level 1 of the Inventory Stage (I). This is where information regarding the Machine/Line process is input and displayed.

FIG. 27 is the Machine/Line Process window and is where the process name and description are input at this 2nd level is input and displayed.

FIG. 28 is the Baseline Process window and is where the process name and description are input for the $3^{rd}$ level and displayed FIG. 29 is the Elemental Components window allows for input of selection of an elemental component as displayed.

FIG. 30 is a Product Inventory window and illustrates how different processes such as "assembling the box" and "spray painting the welded box" are displayed by "decomposition" and "baseline" processes are selected and displayed.

FIG. 31 is a Product Selection window for Determination Process (II) and is where the product name and product description are selected and displayed.

FIG. 32 is a Product Specification window which indicates the product title and displays the version of the model based on user input. Here a summary of previous work can be reviewed.

FIG. 33 is a Determination Driver Values window, where the component title is displayed, and the driver title, unit, and value is chosen. In addition, the definition of the process is shown "baseline", and the level and associated title of the process is shown; Product is "Demonstration—Painted Box", Machine/Line is "Assembling the box", and Subprocess is "Cutting metal sheets into rectangular pieces".

FIG. 34 is another Determination Driver Values window for the another "branch" of the process, entitled "Demonstration -welding" as displayed in the component title box. Again driver titles, units, and values are assigned and displayed. Here the subprocess, however, is "Welding seams to form box and its cover".

FIG. 35 is a Valuation Stage (III) window where the product name is again displayed, and all previous versions of the model used to describe the product or process are summarized and can be reviewed.

FIG. 36 is a Valuation Method window, and allows for selection of a valuation method. This can be ELU (environmental load units, BU—Boustead units, or currency values. The selection choice is based on the availability within the relational database. Both product name and instance label are displayed and a record made that will later appear in the Valuation Stage window (as shown in FIG. 35).

FIG. 37 is a Graphical Results window and displays a summary of all the levels of the hierarchy data input during the Inventory (I) and Determination (II) stages. FIG. 37 can be further "decomposed" as shown in FIG. 38. The "Total Process Load" is calculated in BU units for the painted box manufactured as shown in FIG. 23 and the total substance value is given as 9806.13.

FIG. 38 is also a Graphical Results window, showing the valuation difference between summation of the entire hierarchy at the product level and that of the Machine/Line process. Here the "Total Process Load" is shown to be 6549.8 BU units in substance value, representing the difference (lower load) in environmental load burden due to not painting the box.

FIG. 39 is also a Graphical Results window that shows the process load associated with "cutting metal sheets into rectangular pieces". The load is so relatively low here, that the substance value is shown to be 0.3 BU units and no graphical bar appears.

FIG. 40 is a corollary to FIG. 39 except it shows a Numerical Result window. The results are identical to those of the Graphical Results window of FIG. 39 except that no bar graph is given.

FIG. 41 is a corollary to FIG. 37 except it shows a Numerical Result window. The results are identical to those of the Graphical Results window of FIG. 37 except that no bar graph is given.

DETAILED DESCRIPTION OF THE PREFERRED EMBODIMENTS

Detailed descriptions of the preferred embodiment are provided herein. It is to be understood, however, that the present invention may be embodied in various forms. As software and hardware applications become ever more complex and faster, it is likely that the inventive concepts contained herewithin will be used to achieve near or actual real time data access and manipulation from databases that are publicly accessed via the internet. The software application described herewithin could be developed to include Internet access and provided for workgroups in cyberspace. Therefore, specific details disclosed herein are not to be interpreted as limiting, but rather as a basis for the claims and as a representative basis for teaching one skilled in the art to employ the present invention in virtually any appropriately detailed system, structure or manner.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

Figure 1:
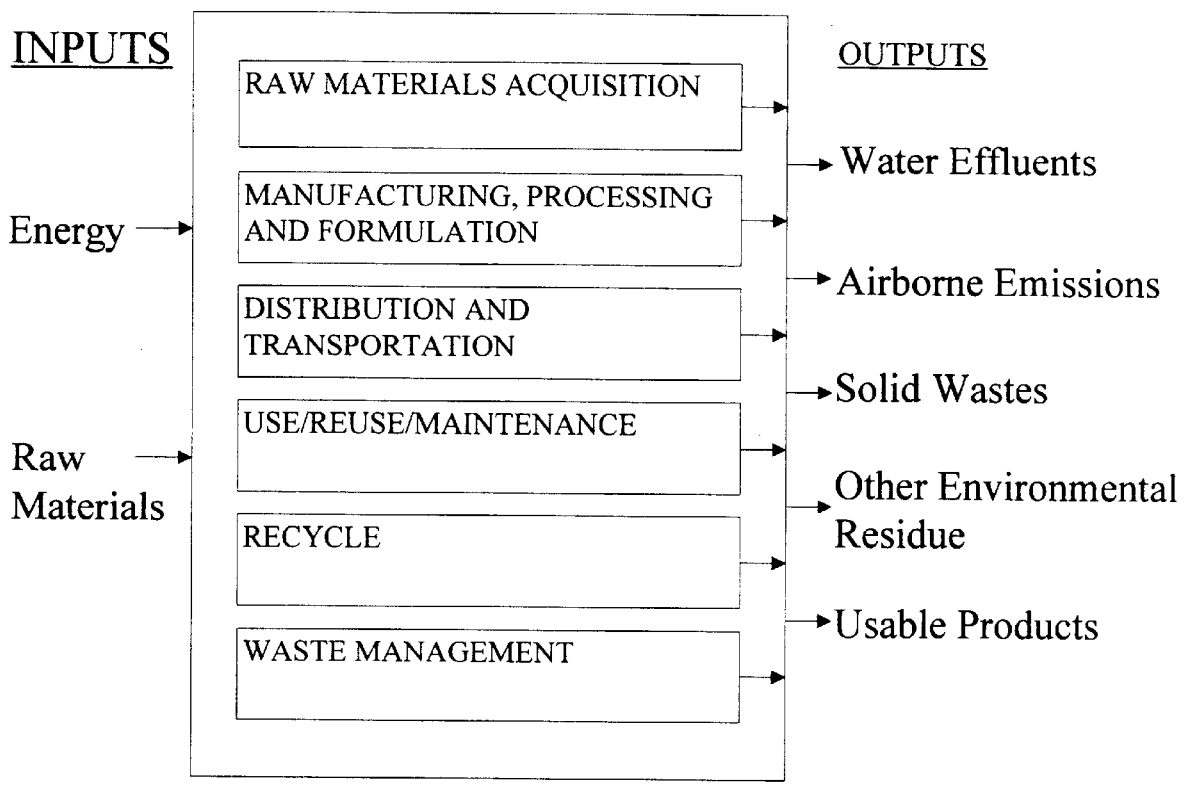
FIG. 1 is Background Art of a schematic indicating the major elements of a conventional Life Cycle Assessment/Analysis. The inputs of raw materials (mass) and energy and outputs of water effluents, airborne emissions, solid wastes, environmental residue (wastes) and usable products, are indicative of the mass and energy balance approach used for the majority of LCA studies.
Figure 2:
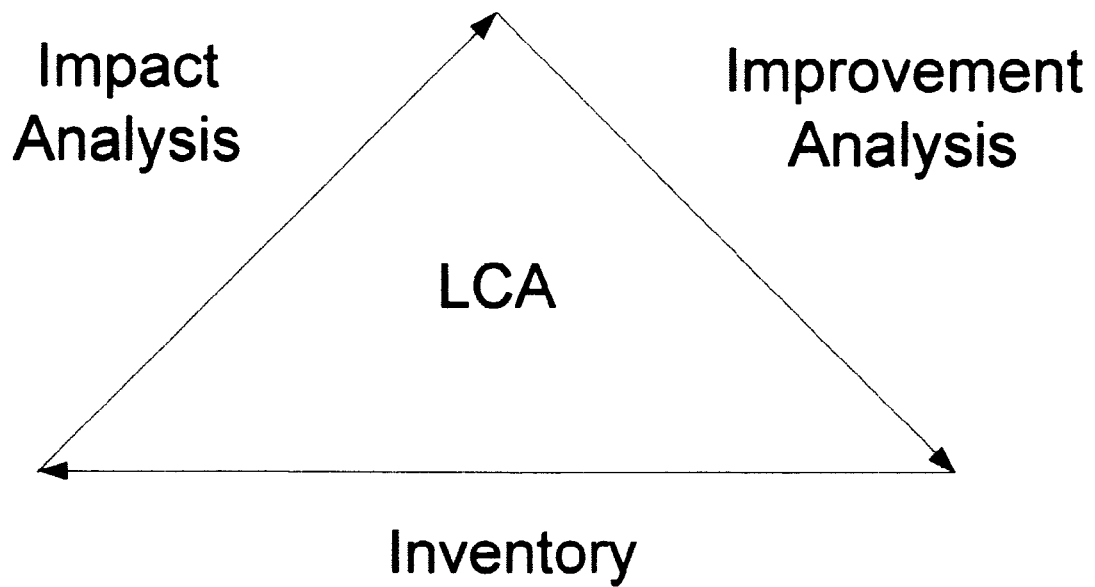
FIG. 2 is Background Art showing the SETAC triangle illustrating the continuous improvement nature of LCA. The arrows associated with FIG. 2 indicates that the "triangle" of (I) inventory, (II) impact analysis, and (III) improvement analysis (or assessment) is a continuous process so that improvement, by reduction of environmental burden, can be accomplished.
Figure 3:
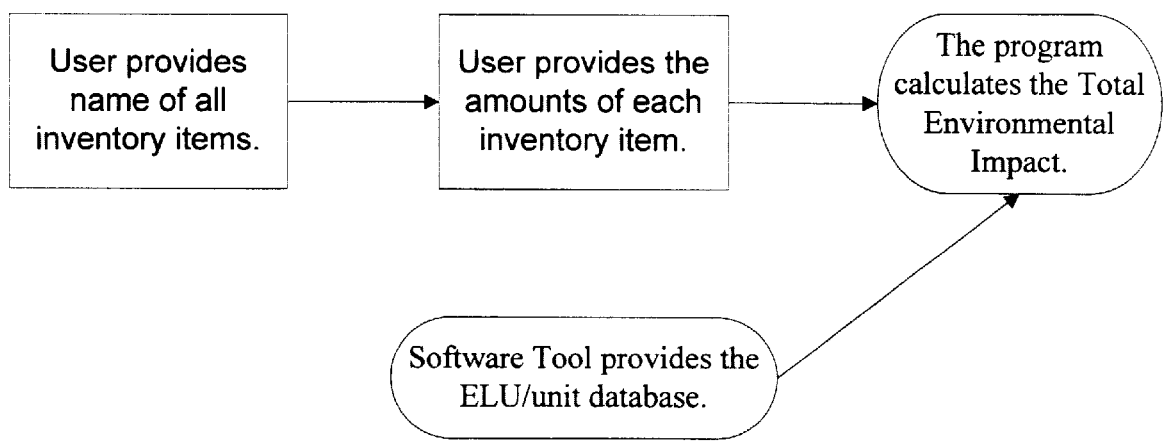
FIG. 3 is a block diagram depicting the LCA approach for the available software tools existing prior to the present invention. In the conventional approach shown, using mass and energy balance data, the user provides only the amounts of each inventoried item. The software tool then provides the valuation units (ELU's—environmental load units for example—or other valuation schemes) from a database and the program calculates the total environmental impact.
Figure 4:
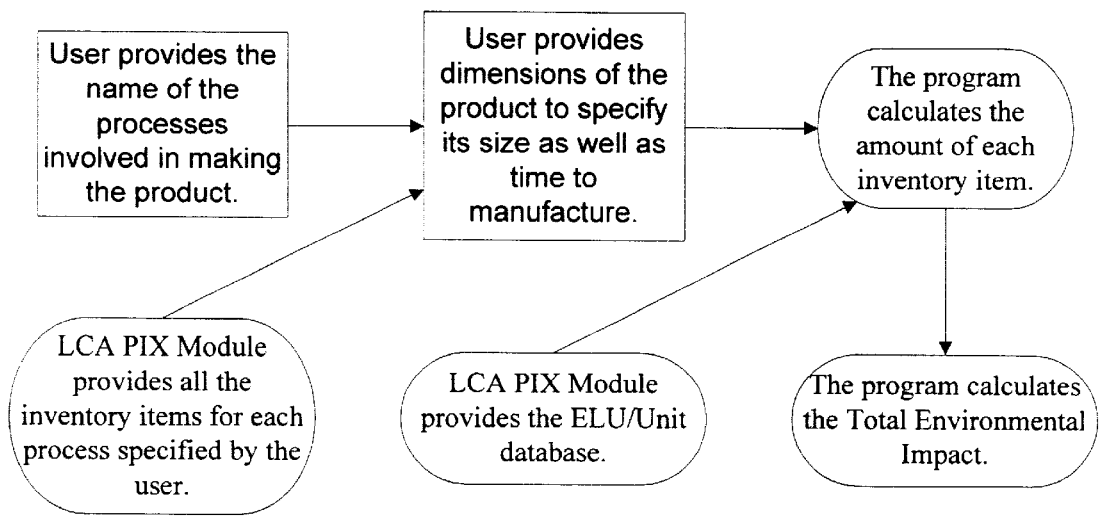
FIG. 4 is a block diagram depicting the LCA/ABC approach for the LCAPIX software module of the present invention. The missing information from the approach in FIG. 3 is significant. As provided for in FIG. 4, several inventoried items required for each process specified by the user are now included. Dimensions of the product, size of the process equipment, or time required to perform a task are also included to ensure that no essential tasks are omitted from the analysis. For LCA studies that attempt the more detailed approach, as indicated in FIG. 4, no software existed prior to methodology and operations provided by the LCAPIX software module.
Figure 5:
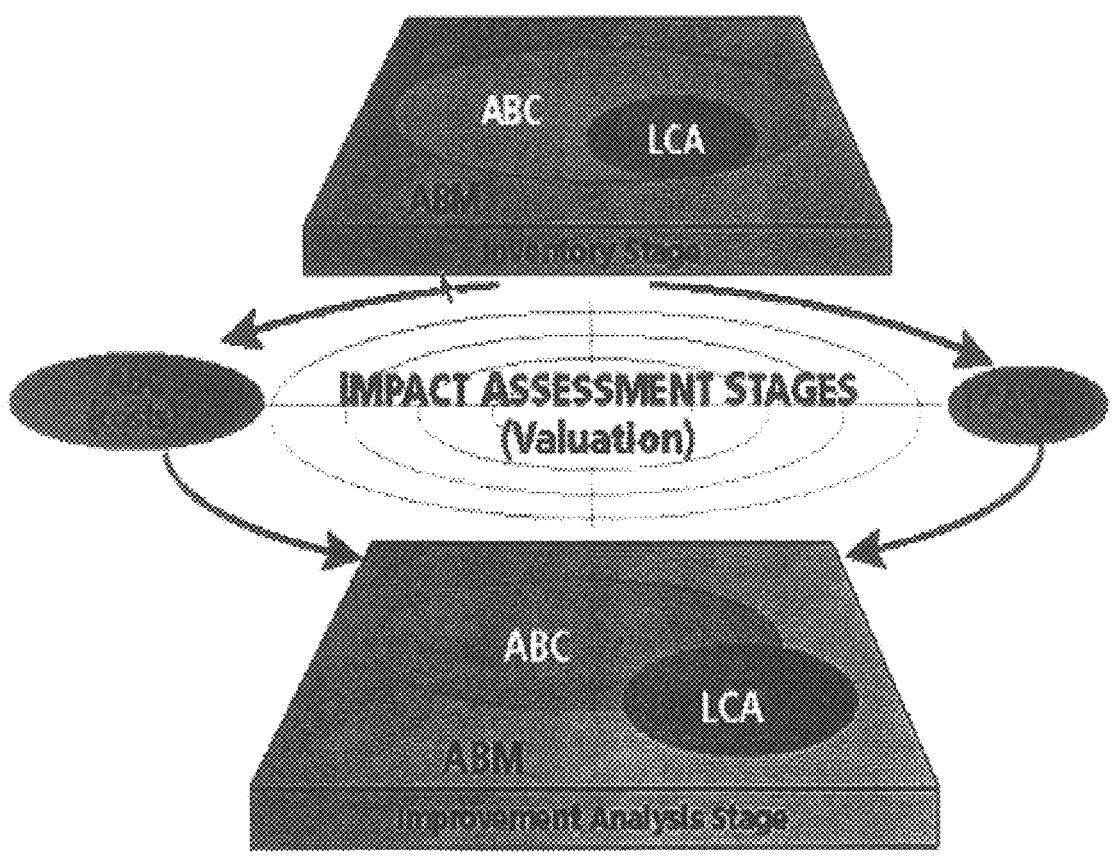
FIG. 5 is a Venn diagram that illustrates both the initial conceptual merger of these two methods previously used by individuals skilled in either the engineering sciences (LCA) or in the accounting (ABC) disciplines, as well as providing an overall model for the LCAPIX software module of the present invention. The top "platform" of FIG. 5 illustrates that for both LCA and ABC, an inventory stage is required where LCA can be considered a subset of ABC and ABM. One then has a choice as to whether the next procedure will involve determination of costs via the conventional ABC approach or determination and valuation by "environmental load indices" assigned to various activities and objects. In both cases, the evaluation of the inventoried data results in the Impact Assessment Stage (II) according to ISO 14000 practices. These operations may be performed simultaneously using the LCAPIX software module. Finally, the improvement analysis stage (III) is shown to reside on an identical platform, but at some later time, as the inventory stage, again indicating that LCA can be considered a subset of ABC. The improvement analysis stage can be used for environmental and strategic planning of the product, process, or service under analysis.
Figure 6:
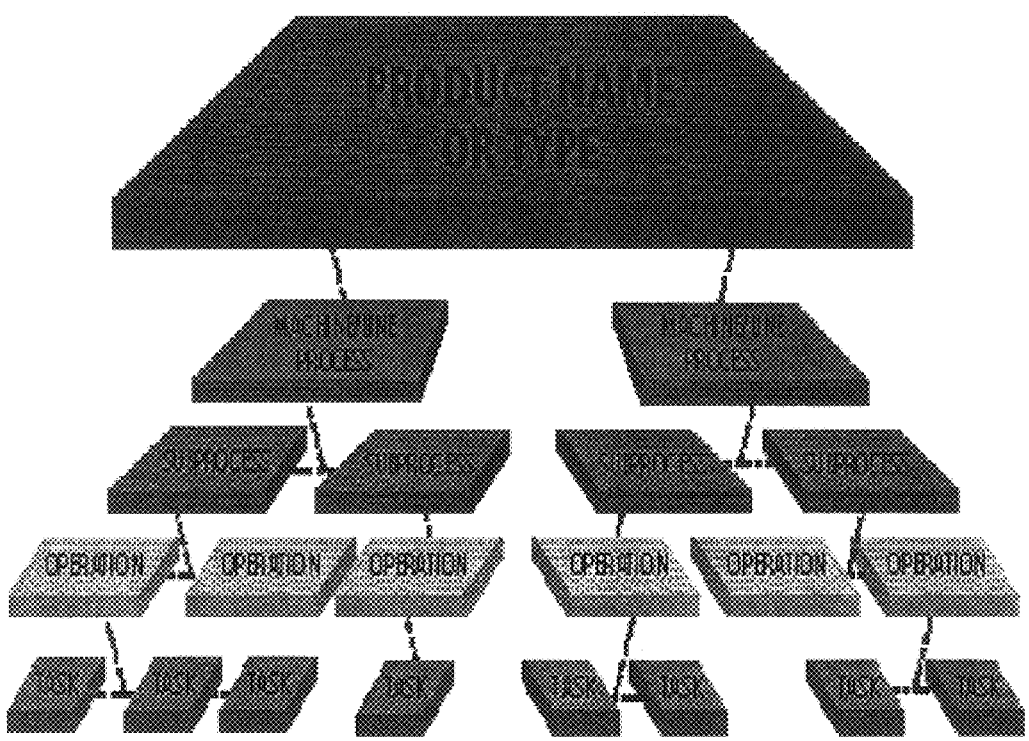
FIG. 6 represents the LCA Product/Process Schema for the LCAPIX software and is a key element used in the approach to combine LCA with ABC to determine both environmental load burdens and associated costs for providing a product, process, or service. The figure shows a 5 stage or level stepwise procedure that can be used to model most common processes involved in product manufacture, processing methods or service provisions. Starting from the top and heading to the bottom (top to bottom analysis is equally effective and provided for in the LCAPIX software module), the user can first indicate the product/process type or name. At all; the remaining levels, data is associated with the level or stage to accomplish this final product, process, or service. Next, at level 2, a machine/ line process can be detailed. This Machine/Line stage could simulate an entire manufacturing portion of an industrial plant production line where one or thousands of widgets are produced daily, weekly, or monthly. At level 3, the subprocess level is provided for where data can be entered regarding some pre-machine line process stage item. At level 4, the operation level is provided for where data can be entered regarding some pre-subprocess stage item. Finally, at level 5, determination of a set of rudimentary tasks associated with the product at stage 1 is possible. The hierarchy described may be truncated at any level for less than 5 stepwise procedure or concatonated with subsequent procedures that can be modeled using 5 or less steps. In this way, a 10, 20, 100, 200, or even 2000 step wise procedure (such as required in producing an automobile or airplane) can be modeled. The flexibility of the model should now be evident in that the product at level 1 (under analysis) could be an entire building or just a desk within that building. Another example is that the product could be the wing of an aircraft or the entire airplane. In each case, the LCAPIX software module is capable of accepting the data for as many of the stages represented in the model hierarchy as required to fully and adequately perform an LCA/ABC analysis.
Figure 7:
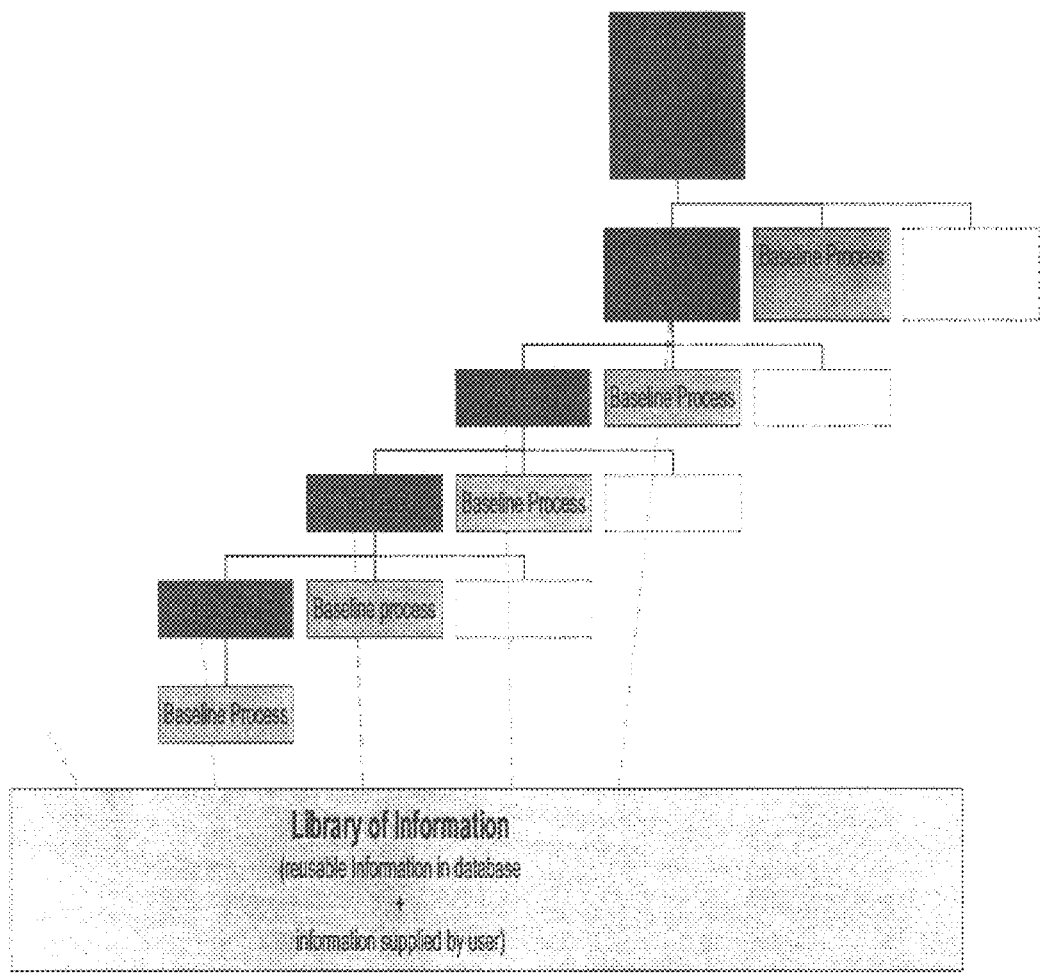
FIG. 7 is the Process Hierarchy for a Product according to the LCAPIX software module. It can have a maximum depth of 5. The Baseline Process is the lowest level process for each branch and can be at any level of the hierarchy. The LCAPIX module reduces the product, process, or service into 5 or more (or less) separate and distinct stages (including the product name) or levels as shown in FIG. 6, and allows for completing ABC or LCA studies simultaneously (or individually at an earlier or later time). Before the reduction of this invention to practice, no known practical hierarchical scheme generically describing a product, process, or service in this manner existed such that a useful associated software application combining LCA with ABC could be developed. By first perfecting this hierarchical scheme and subsequently developing the LCAPIX software application incorporating this scheme, LCA/ABC studies that heretofore required weeks or months can now be accomplished in days or even hours by use of the LCAPIX software module.
Figure 8:
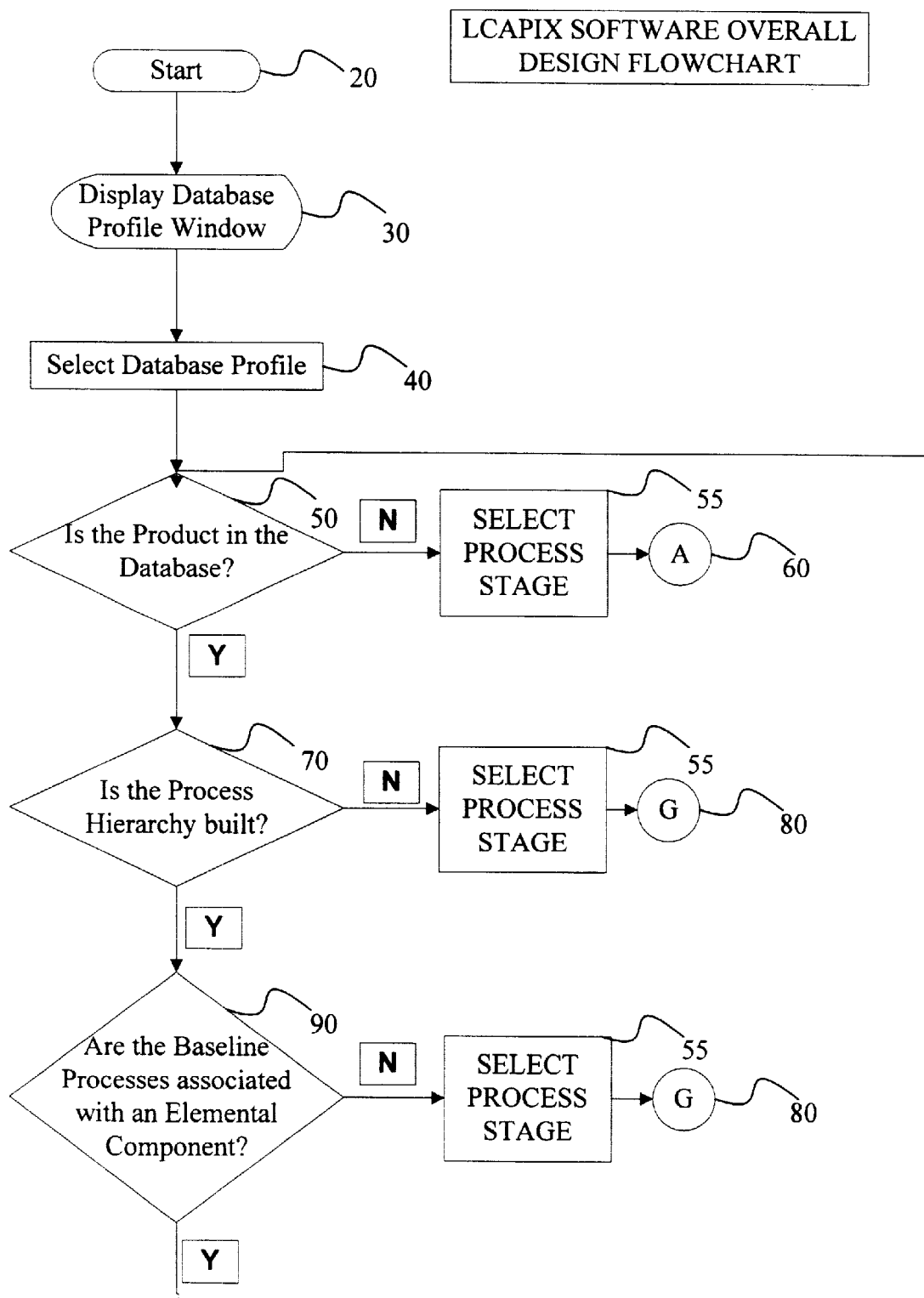
FIG. 8 is the LCAPIX Software Overall Design Flowchart, depicts a flowchart indicating how LCA/ABC was integrated to perform the essential required functions using drivers, driver units, and driver values necessary to achieve the desired result(s). A conceptual corollary to this flowchart is depicted in the Venn diagram of FIG. 22.
Figure 8:
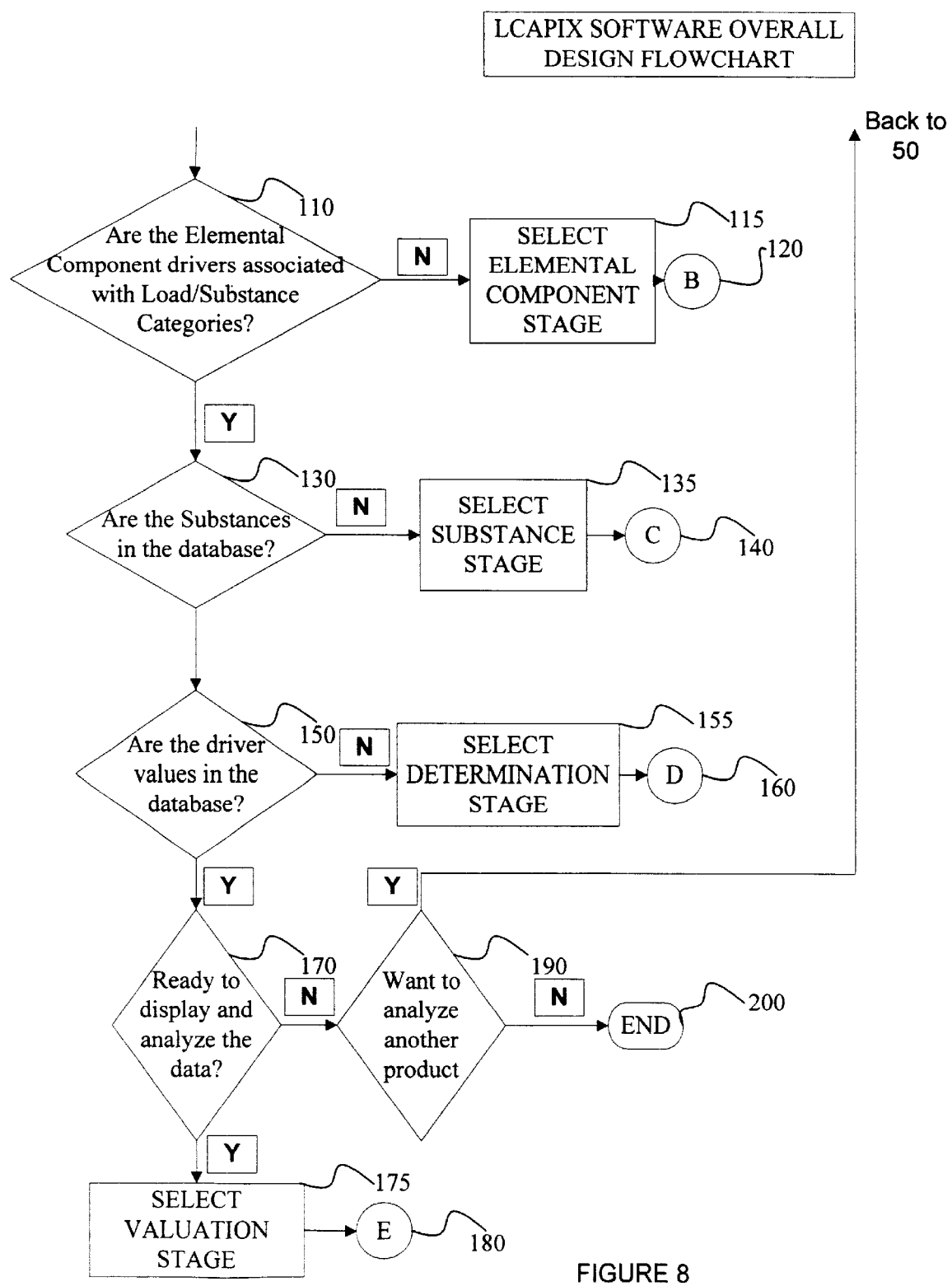

FIG. 8, the LCAPIX Software Overall Design Flowchart, depicts a flowchart indicating how LCA/ABC was integrated to perform the essential required functions using drivers, driver units, and driver values necessary to achieve the desired result(s). The program is initiated as shown in the start box 20, as the database window 30 is displayed. Next, the database profile is selected 40, then it must be determined if a product, process or service exists in the relational database 50. If the product is not in the database, then the process stage 55 must first be selected and then go to entry point A, 60.

If the product exists in the database, then it must be decided if the process hierarchy has been built 70, if not, select the process stage again 55, then go to entry point G, 80. If the process hierarchy has been built, a decision must be made, 90, regarding whether or not the baseline processes are associated with an elemental component. Again, if not, select the process stage again 55, then go to entry point G, 80. If so, then another decision must be regarding elemental component drivers associated with load substance categories, 110. If not, then select the elemental component stage 115, and then go to entry point B, 120.

Next, a decision must be made to establish if the substance exists in the relational database, 130. If the substance does not exist in the database, select the substance stage 135 and then go to entry point C, 140. However, if the hopeful result is that the substance is defined in the database, then the question becomes if the driver values have been previously assigned or not 150. If no driver values are in the database, then select the determination stage 155. Then go to entry point D, 160.

Finally, another decision must be made regarding analysis and display of the data, 170. If analysis and display is desired (yes), select valuation stage 175, and go to entry point E, 180. If no display or analysis is required (no) then go analyze another product, 190 beginning at 50, or end and exit the LCAPIX software application 200.

Figure 9:
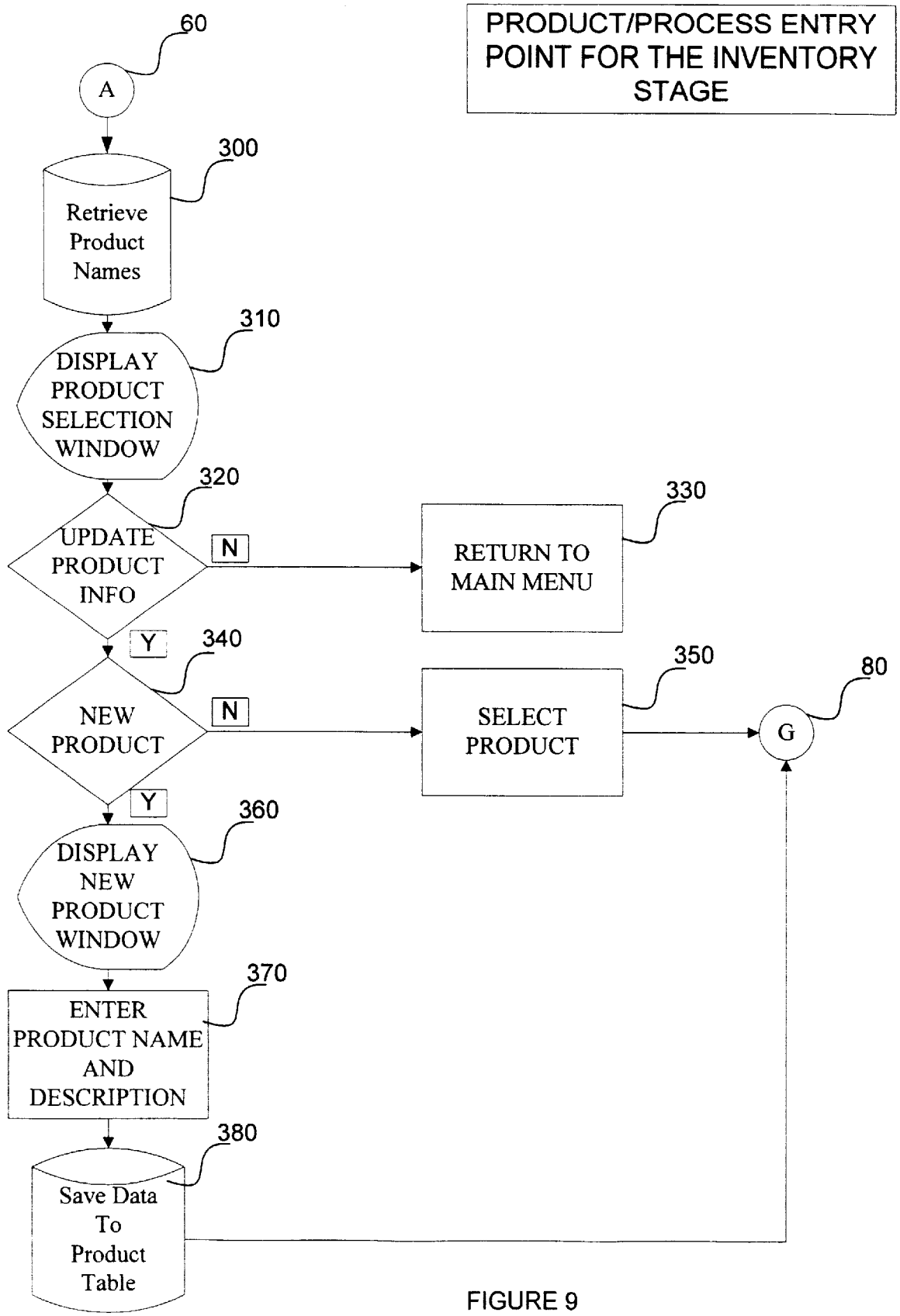
FIG. 9 is a flowchart depicting how to enter the product, process, or service in the beginning of the process stage by selecting a previously analyzed or named new product.

FIG. 9, is a flowchart depicting how to enter the product, process, or service in the beginning of the process stage by selecting a previously analyzed or naming a new product. Beginning at the entry point A, 60, the product names are retrieved from the database, 300. Next the product selection window is displayed, 310. A decision, is required regarding the product information, if no update is required, 320 return to main menu 330. If it is required, then the question becomes if the product is new or not, 340. If the product is not new, then select the product, 350 and go to entry point G, 80. If the product is new, display the new product window, 360. Next, 370, the new product name and description must be entered. Data is saved, 380 and go to entry point G, 80.

Figure 10:
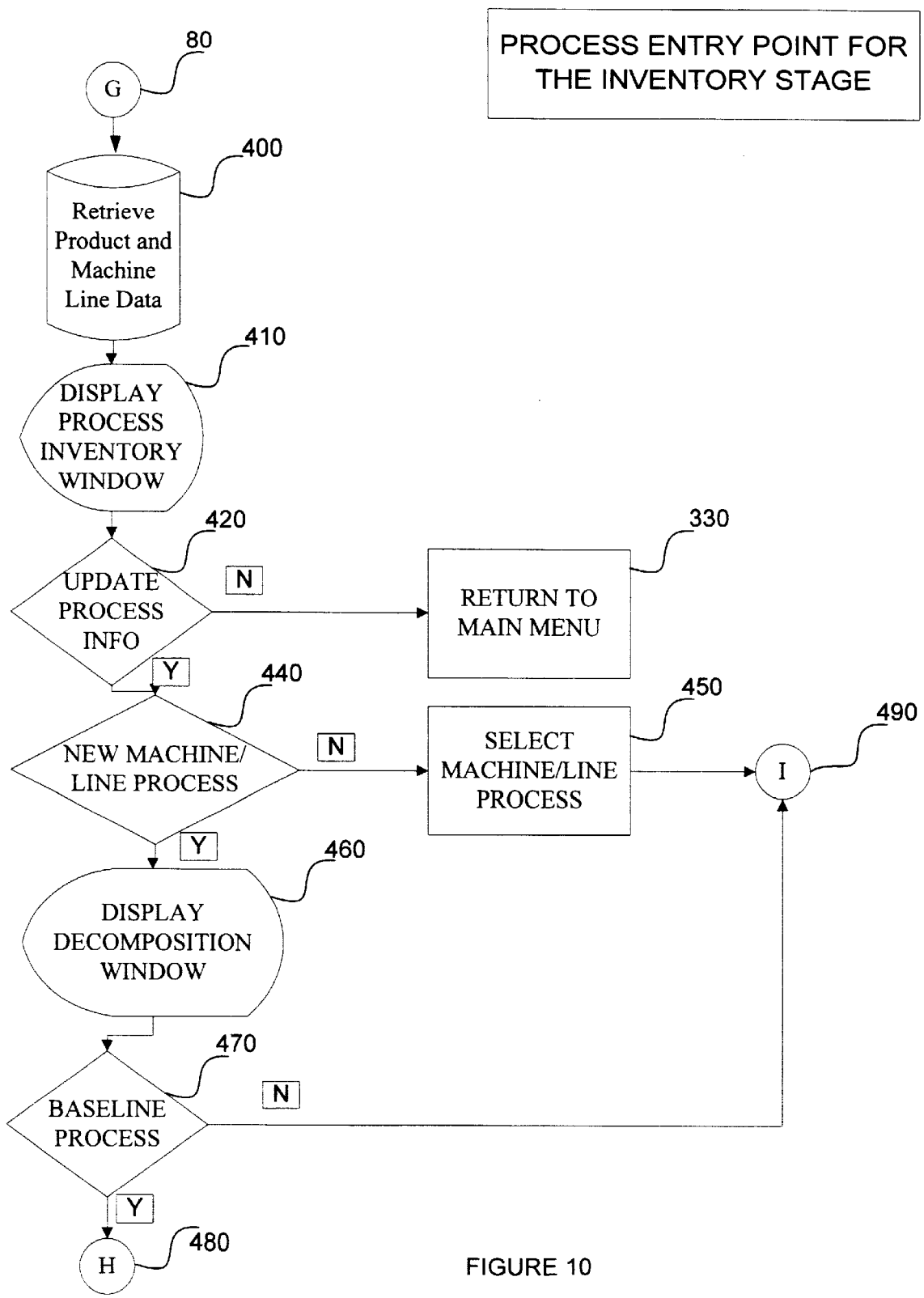
FIG. 10, is a flowchart describing how the LCAPIX module software works beginning at the entry point, G, for the Process Entry point for the Inventory Stage (I) corresponding to level or stage 1. Beginning at the entry point G, the product and machine line names are retrieved from the database.

FIG. 10, is a flowchart depicting the entry point, G, 80 for the Process Entry point for the Inventory Stage (I). Beginning at the entry point G, 80, the product and machine line names are retrieved from the database, 400. Next the process inventory window is displayed, 410. A decision is required to update the process information, 420, if no update is required, return to main menu 330. If it is required, then the question becomes if the machine line process is new or not, 430. If the machine line process is not new, then select the machine line process, 450 and go to entry point I, 490. If the machine line process is new, the decomposition window is displayed, 460. Next, it must be determined if the machine line process is the baseline process (does it terminate ?), 470. If not, then go to entry point I, 490. If so, go to entry point H, 480.

Figure 11:
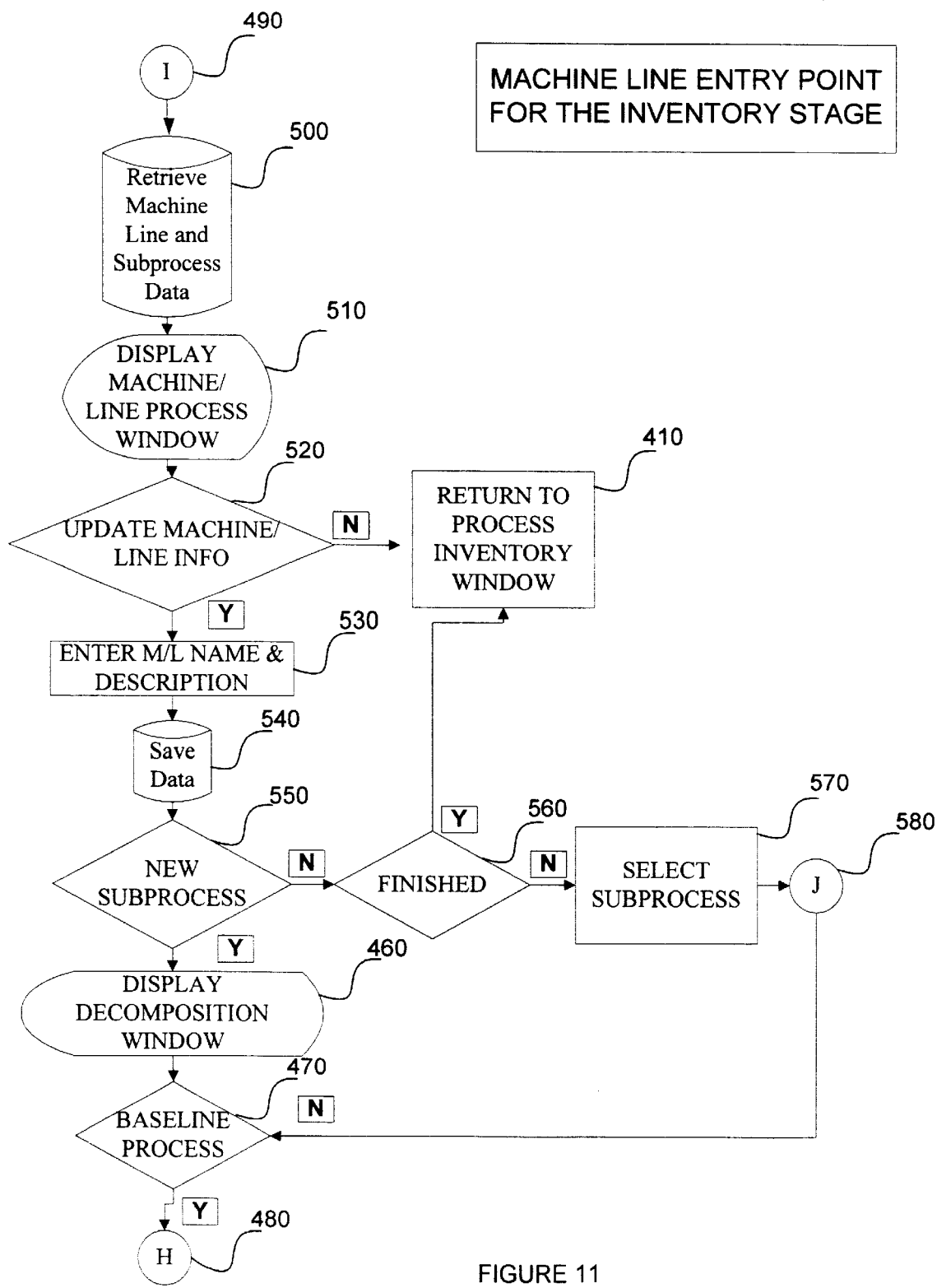
FIG. 11 is a flowchart describing how the LCAPIX module software works beginning at the entry point, I, for the Machine Line Entry Point for the Inventory Stage (I), corresponding to level or stage 2. Beginning at the entry point I, the machine line and subprocess names are retrieved from the database.

FIG. 11 is a flowchart depicting the entry point, I, 490 for the Machine Line Entry Point for the Inventory Stage (I). Beginning at the entry point I, 490, the machine line and subprocess names are retrieved from the database, 500. Next the machine line process window is displayed, 510. A decision is required regarding update of the machine line process information, 520. If no update is required, return to the process inventory window 410. Next, if an update is to be made, enter the Machine Line name and description, 530, then save the data to the database, 540. Then, the next decision is if there is a new subprocess to be added, 550. If not, another decision must be made; to either finish or select a subprocess, 560. If finished, return to the process inventory window, 410. If not, finished selection of the subprocess is made, 570, and go to entry point J, 580.

If there is going to be a new subprocess, display the decomposition window, 460. Next, it must be understood if the subprocess will become the baseline process (is being terminated), 470. If not, then go to entry point J, 580. If so, go to entry point H, 480.

Figure 12:
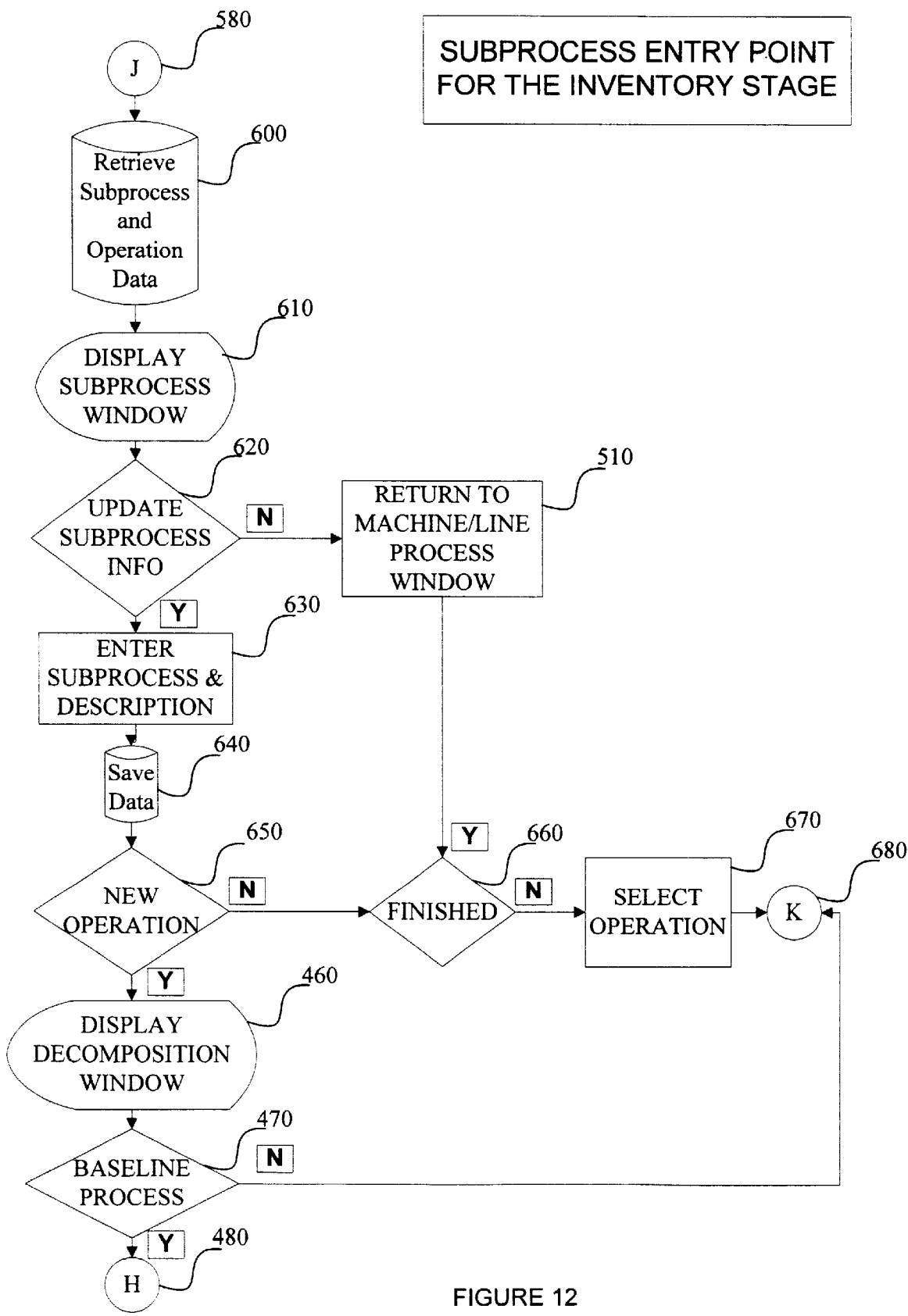
FIG. 12 is a flowchart describing how the LCAPIX module software works beginning at the entry point, J, for the Subprocess Entry Point of the Inventory Stage (I), corresponding to level or stage 3. Beginning at the entry point J, subprocess and operation data are retrieved form the database.

FIG. 12, is a flowchart depicting the entry point, J, 580 for the Subprocess Entry Point of the Inventory Stage (I). Beginning at the entry point J, 580, the subprocess and operation data are retrieved, 600. Next the subprocess process window is displayed, 610. A decision, is required regarding the subprocess information, 620. If no update is required, return to the machine line process window, 510. If it is required, then 630, enter the subprocess name and description and the data is saved, 640. Then another decision must be made; to add a new process or not, 650. If not, a decision to finish or not is required, 660. If finished, return to the Machine Line process window, 510, or select an operation, 670 and go to entry point K, 680. If there is going to be a new operation, display the decomposition window, 460. Next, it must be understood if the operation will become a baseline process (is being terminated), 470. If not, then go to entry point K, 680. If so, go to entry point H, 480.

Figure 13:
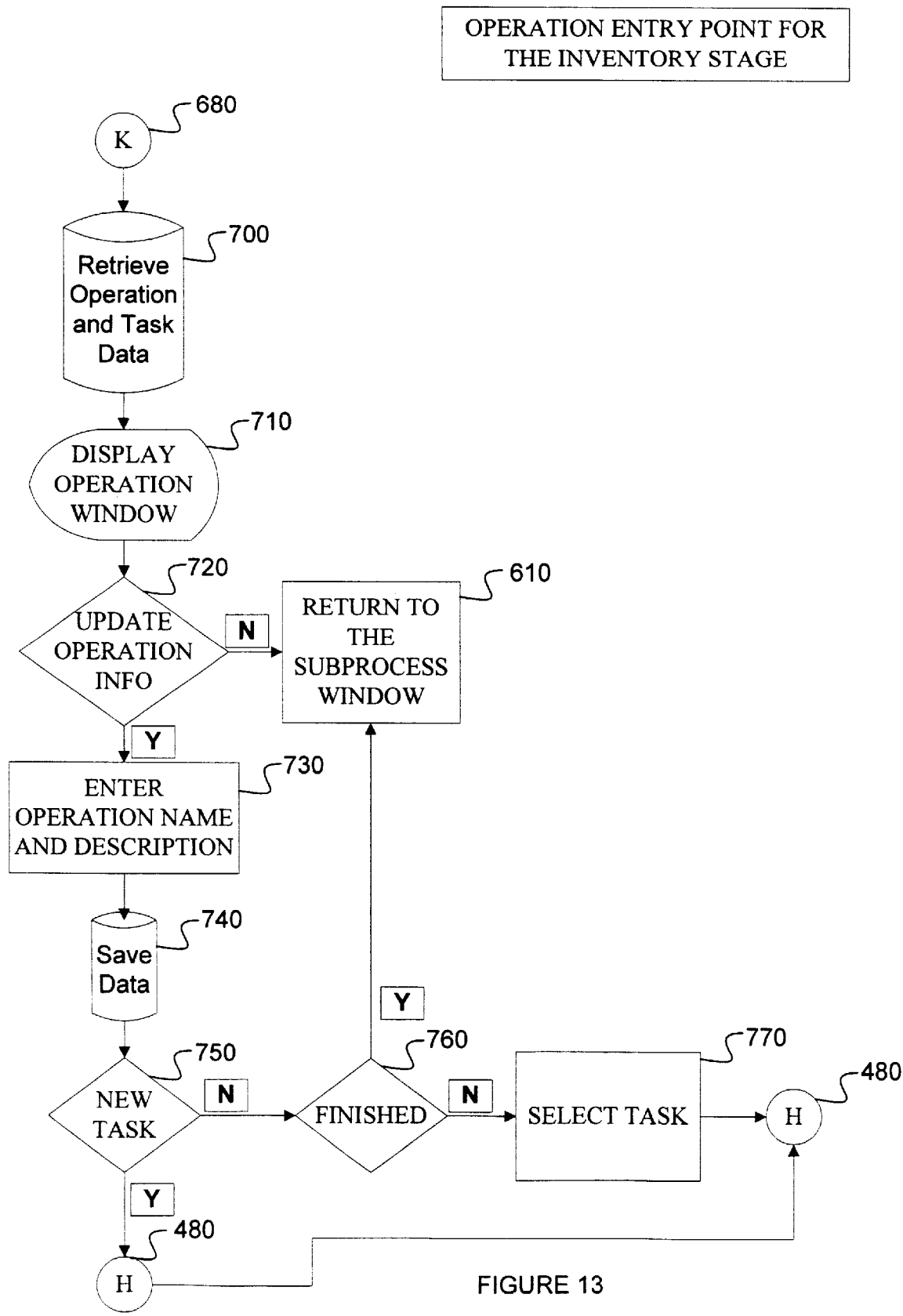
FIG. 13 is a flowchart describing how the LCAPIX module software works beginning at the entry point K, for the Operation Entry Point of the Inventory Stage (I), corresponding to level or stage 4. Beginning at the entry point K, the operation and task data are retrieved from the database.

FIG. 13, is a flowchart depicting the entry point K, 680, for the Operation Entry Point of the Inventory Stage (I). Beginning at the entry point K, the operation and task data is retrieved, 700. Next the operation window is displayed, 710. An update decision is required regarding the operation information, 720, if no update required, return to the subprocess window 610. If it is required, then enter the operation name and description, 730, and the data saved, 740. Another decision becomes whether or not to add a new task, 750. If the task is not new, then decide if finished, 760. If finished, return to the subprocess window, 610. If not, then select a task, 770 and go to entry point H, 480. If the task is new, then go directly to entry point H, 480.

Figure 14:
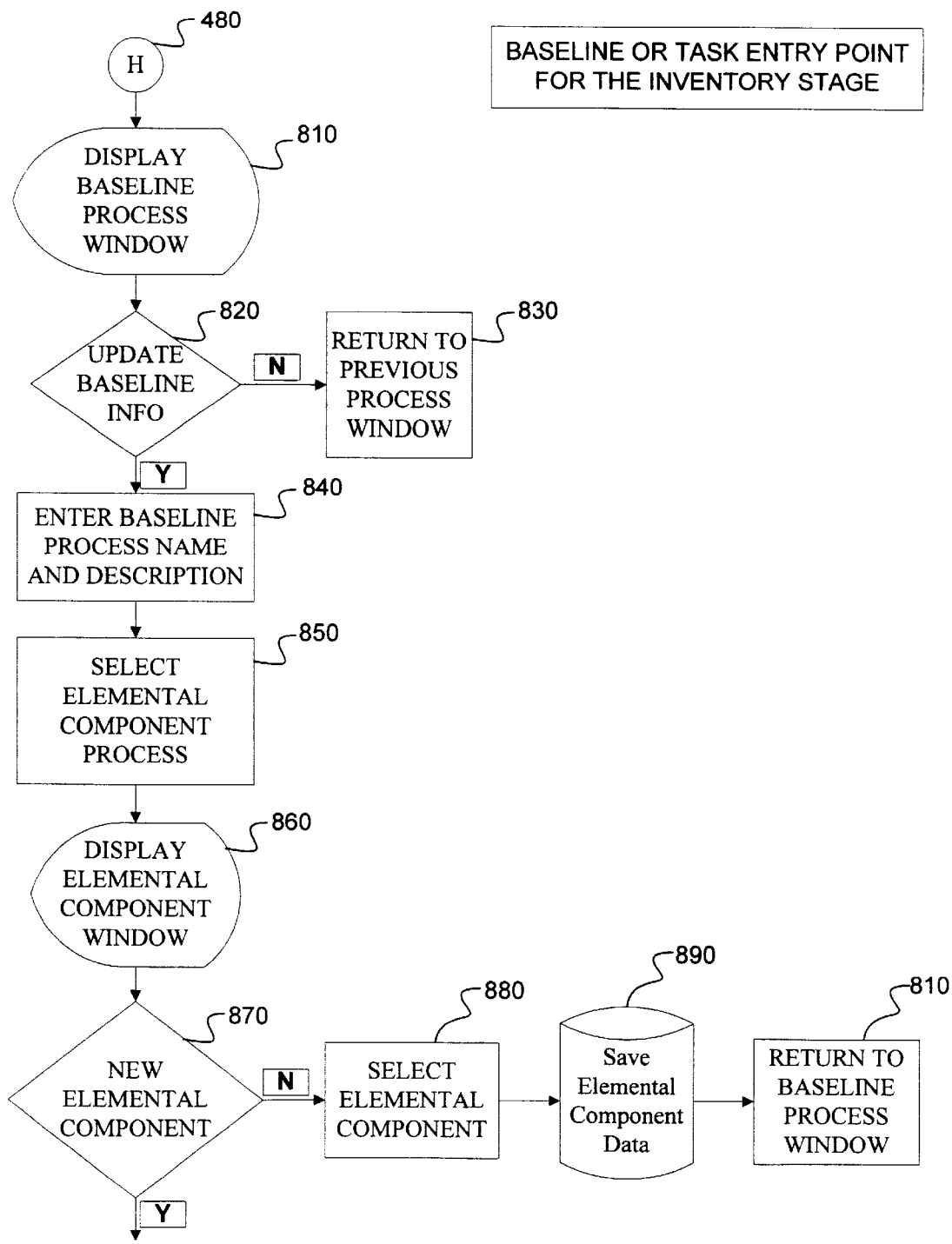
FIG. 14 is a flowchart describing how the LCAPIX module software works beginning at the entry point H, for the Baseline or Task Entry Point of the Inventory Stage (I), corresponding to level or stage 5. Beginning at the entry point H, the baseline process window is displayed and it must be decided if the baseline must be updated or not.
Figure 14:
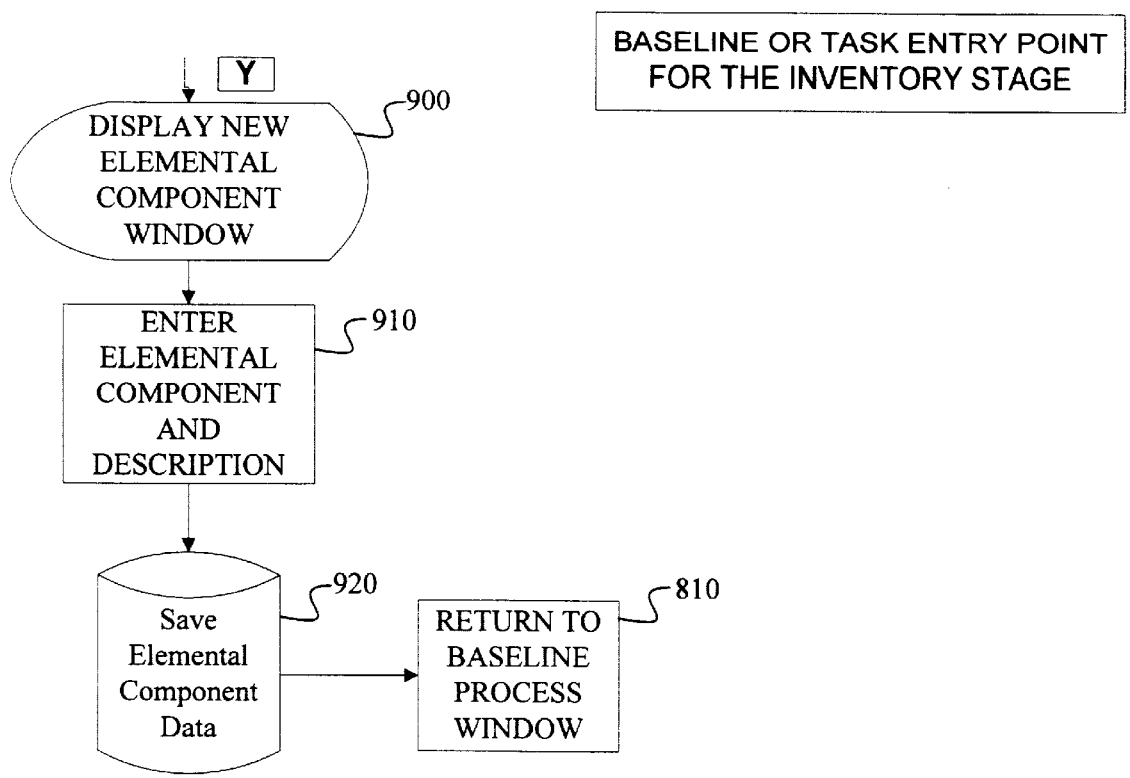

FIG. 14 is a flowchart depicting the entry point H, 480 for the Baseline or Task Entry Point of the Inventory Stage. Beginning at the entry point H, 480, the baseline process window is displayed, 810, and decide, 820 if the baseline must be updated or not. If the baseline is not updated, 830 then return to the previous window (410, 510, 610, or 710 are for returning to the previous stage of the process hierarchy—the product/process, machine/line process, subprocess, and operation display windows respectively). If the baseline is updated then enter the baseline name and description, 840. Next select an elemental component process, 850. Then, 860, the elemental component window is displayed. A decision is required regarding entering a new elemental component or selecting an old elemental component, 870. If not entering a new elemental component, then select an elemental component, 880, and the data is saved, 890, and then return to the baseline window, 810. If a new elemental component is required, then the new elemental component window is displayed, 900. Then enter the elemental component and description, 910. The elemental component data is saved, 920 and return to the previous window (the baseline window), 810.

Figure 15:
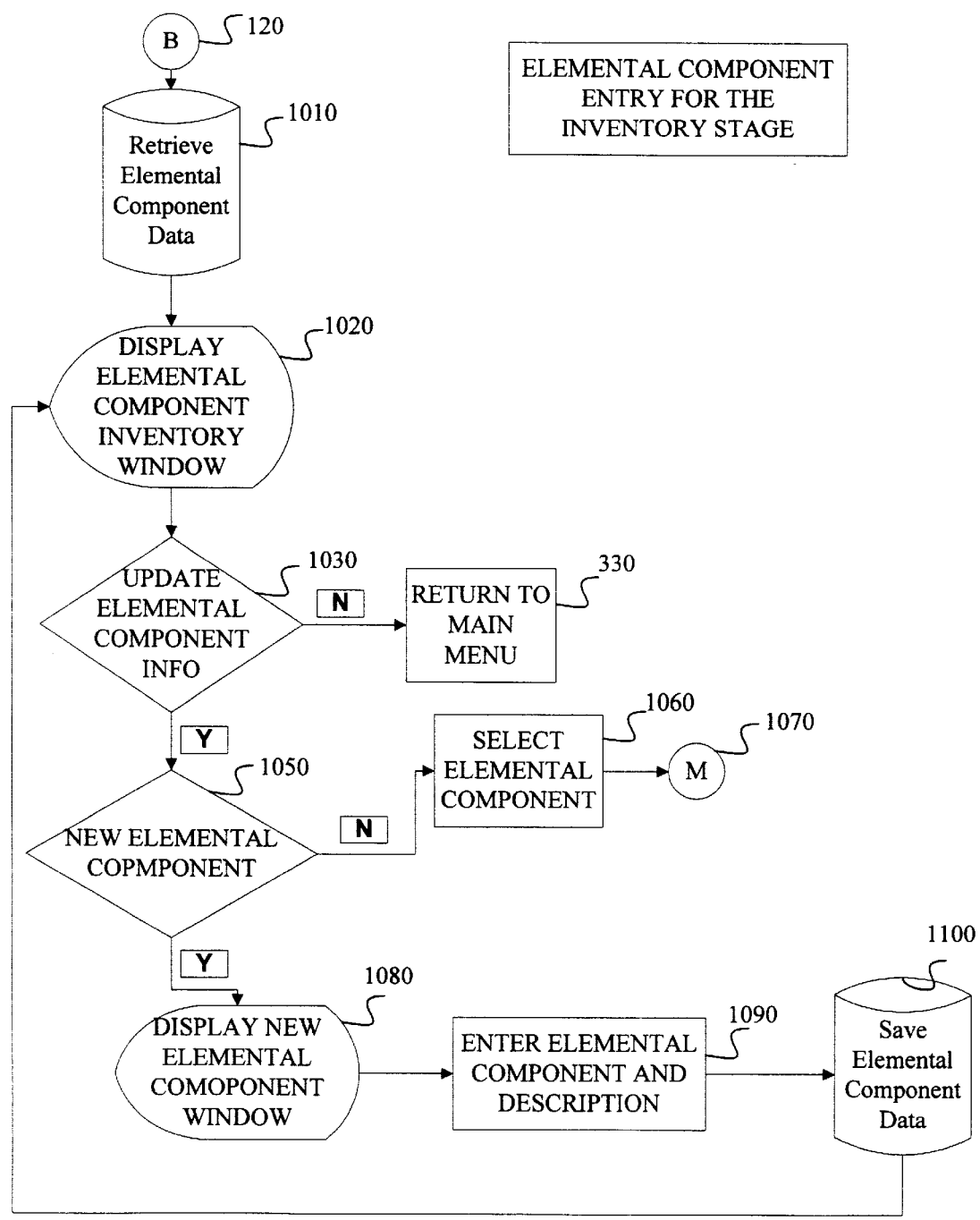
FIG. 15 is a flowchart describing how the LCAPIX module software works regarding the use of the Elemental Component entry point of the Inventory Stage (I). For the Elemental Component of the Inventory Stage, retrieval of the elemental component data from the database is first accomplished.

FIG. 15 is a flowchart depicting the Elemental Component entry point of the Inventory Stage (I) at the entry point, B, 120. For the Elemental Component of the Inventory Stage, the elemental component data is saved, 1010. Next, the elemental component inventory window is displayed, 1020. Then a decision 1030 is required regarding updating the elemental component information. If no update is made, return to the main menu, 330. If the update is performed another decision is made as to if an additional elemental component is added, 1050. If not, select an elemental component, 1060 and go to entry point M, 1070. If adding an additional elemental component, the new elemental component window is displayed, 1080. Next, enter the elemental component name and description, 1090, the elemental component data is saved, 1100, allowing for automatic return to 1020, displaying the elemental component window.

Figure 16:
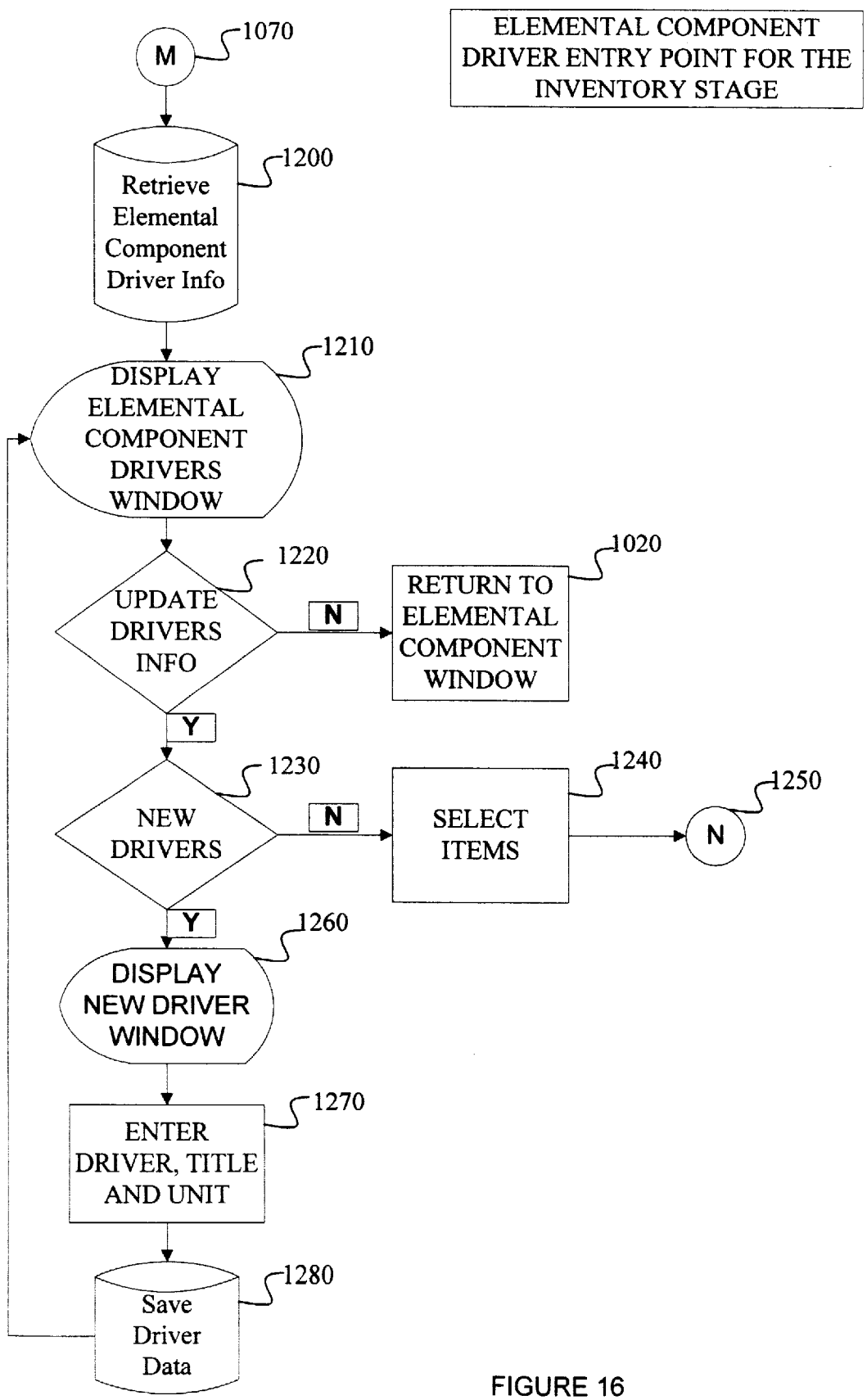
FIG. 16 is a flowchart describing how the LCAPIX module software works for the Elemental Component Driver Entry Point of the Inventory Stage (I). For the Elemental Component of the Inventory Stage (I), retrieval of the elemental component driver data is necessary. Next, the elemental component driver window is displayed. Then a decision is required regarding updating the elemental component driver information.

FIG. 16 is a flowchart for the Elemental Component Driver Entry Point of the Inventory Stage (I) at the entry point, M, 1070. For the Elemental Component of the Inventory Stage, the elemental component driver data is retrieved, 1200. Next, the elemental component driver window is displayed, 1210. Then a decision 1220 is required regarding updating the elemental component driver information. If no update is made, return to the elemental component window, 1020. If the update is performed another decision is to add an additional elemental component driver, 1230. If not, select an item(s), 1240 and go to entry point N, 1250. If adding new drivers, the new driver window is displayed, 1260. Next, enter the driver title and unit, 1270, and the driver data is saved, 1280, allowing for automatic return to 1210, displaying the elemental component window.

Figure 17:
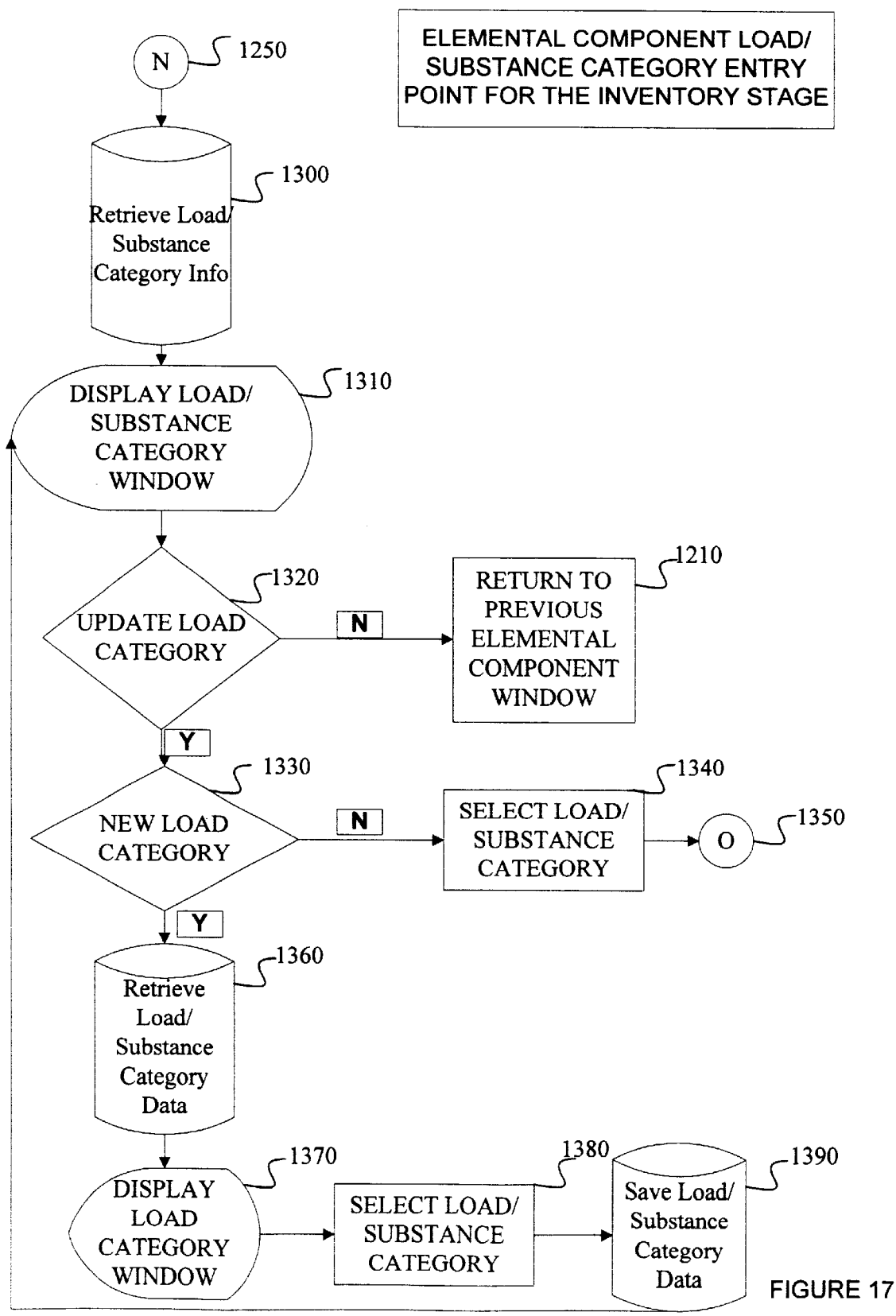
FIG. 17 is a flowchart describing how to use the Elemental Component Load Substance Category Entry Point of the Inventory Stage (I) in the LCAPIX module software. For the Load Substance Category of the Inventory Stage the load substance category information is retrieved from the relational database. Next, the load substance category window is displayed . Then a decision is required regarding changing the load substance category information.

FIG. 17 is a flowchart for the Elemental Component Load Substance Category Entry Point of the Inventory Stage (I) at the entry point N, 1250. For the Load Substance Category of the Inventory Stage, the load substance category information is retrieved from the relational database, 1300. Next, the load substance category window is displayed, 1310. Then a decision 1320 is required regarding changing the load substance category information, 1320. If no change is made, return to the previous elemental component window, 1210. If the change is performed another decision is made to add an additional load substance category, 1330. If not, select the load substance category, 1340 and go to entry point O, 1350. If adding new substance categories, the load substance category data is retrieved from the substance stage, 1360. Next, the load category window title is displayed, 1370, select a substance category, 1380. save the substance category data, 1390, allowing for automatic return to 1310, displaying the load substance category window.

Figure 18:
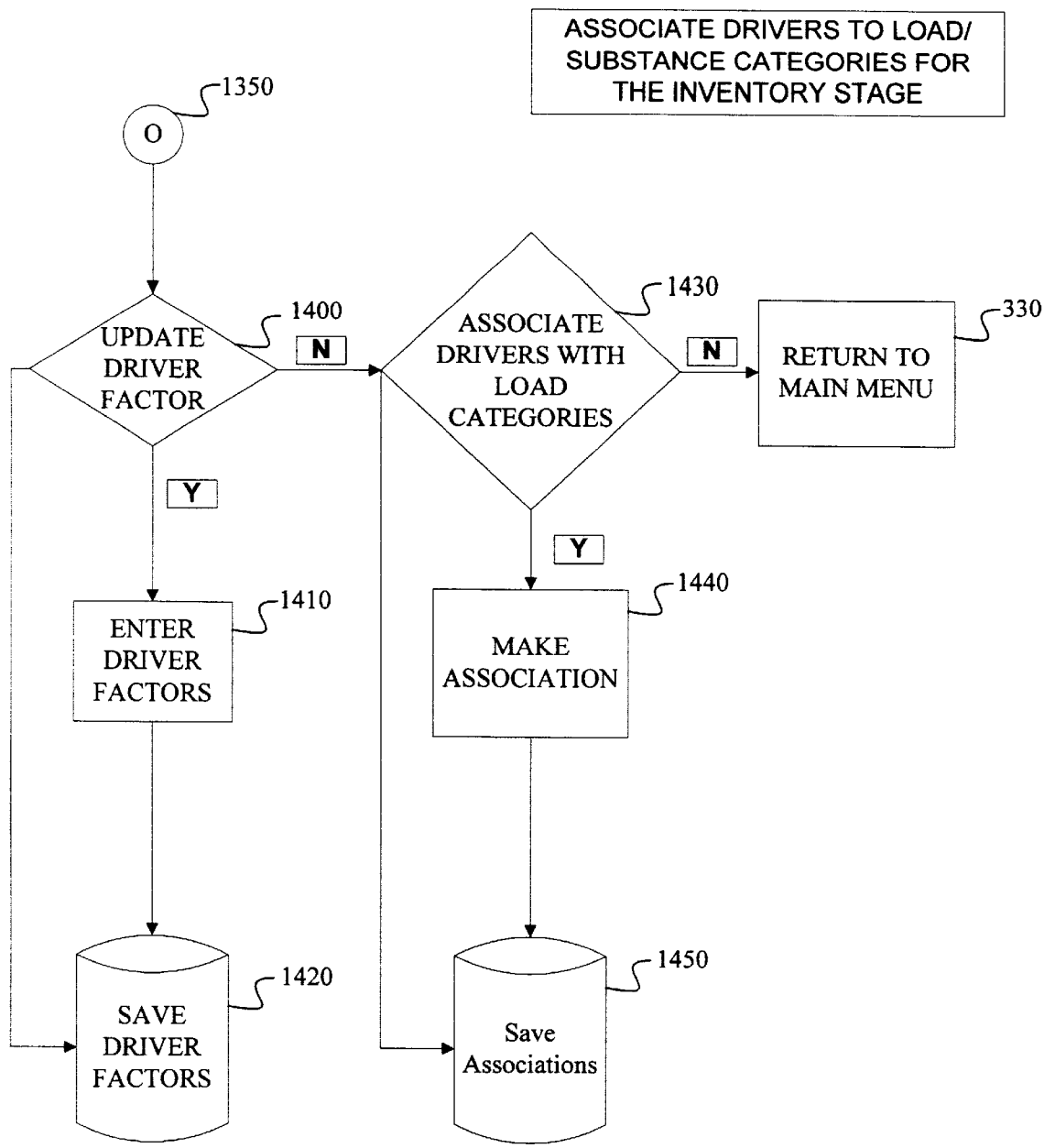
FIG. 18 is a flowchart describing how to associate Drivers to Load Substance Categories at the Entry Point of the Inventory Stage (I) of the LCAPIX module software. For the Associated Drivers of the Inventory Stage, a decision is must be made regarding updating the driver factors. If the driver factors are updated, the driver factors are entered. Then the driver factors are saved and the flow reverts back to the Entry Point continuously until all necessary, desired, and sufficient driver factors have been updated.

FIG. 18 is a flowchart for Associating Drivers to Load Substance Categories Entry Point of the Inventory Stage (I) at entry point, O, 1350. For the Associated Drivers of the Inventory Stage, a decision is made regarding updating the driver factors, 1400. If yes, then update the driver factors, 1410. Then the driver factors are saved 1420 and revert back to 1400 continuously until all necessary, desired, and sufficient driver factors have been updated. If no update is necessary, the decision becomes associating the drivers with load categories, 1430. If yes, make the association, 1440, drivers must be matched with load substance categories. The associations are saved, 1450, and automatic return to 1430 to associate more drivers until all drivers and load substance categories are associated. If no association, then automatic return to the Main Menu window, 330.

Figure 19:
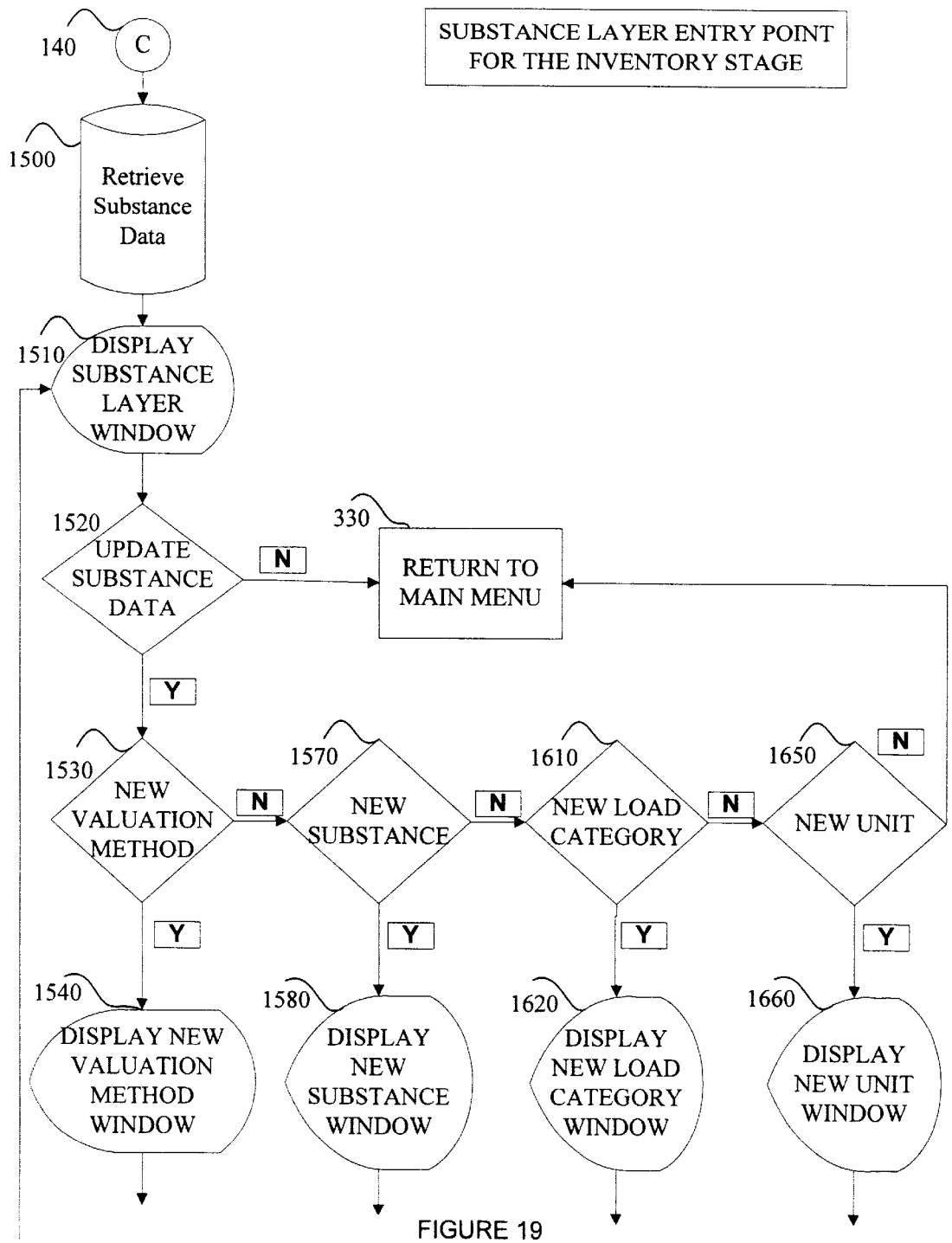
FIG. 19 is a flowchart describing The Substance Layer and relational database Entry Point for the Inventory Stage (I) of the LCAPIX module software First the substance data is retrieved then the substance layer window is displayed. Next a decision is required regarding updating the substance data. If no updating is required, the flow returns to the main menu. If updating is required, another decision becomes mandatory regarding new valuation schemes. If a new valuation scheme is desired, then the new valuation method window is displayed and data entered as shown in the figure.
Figure 19:
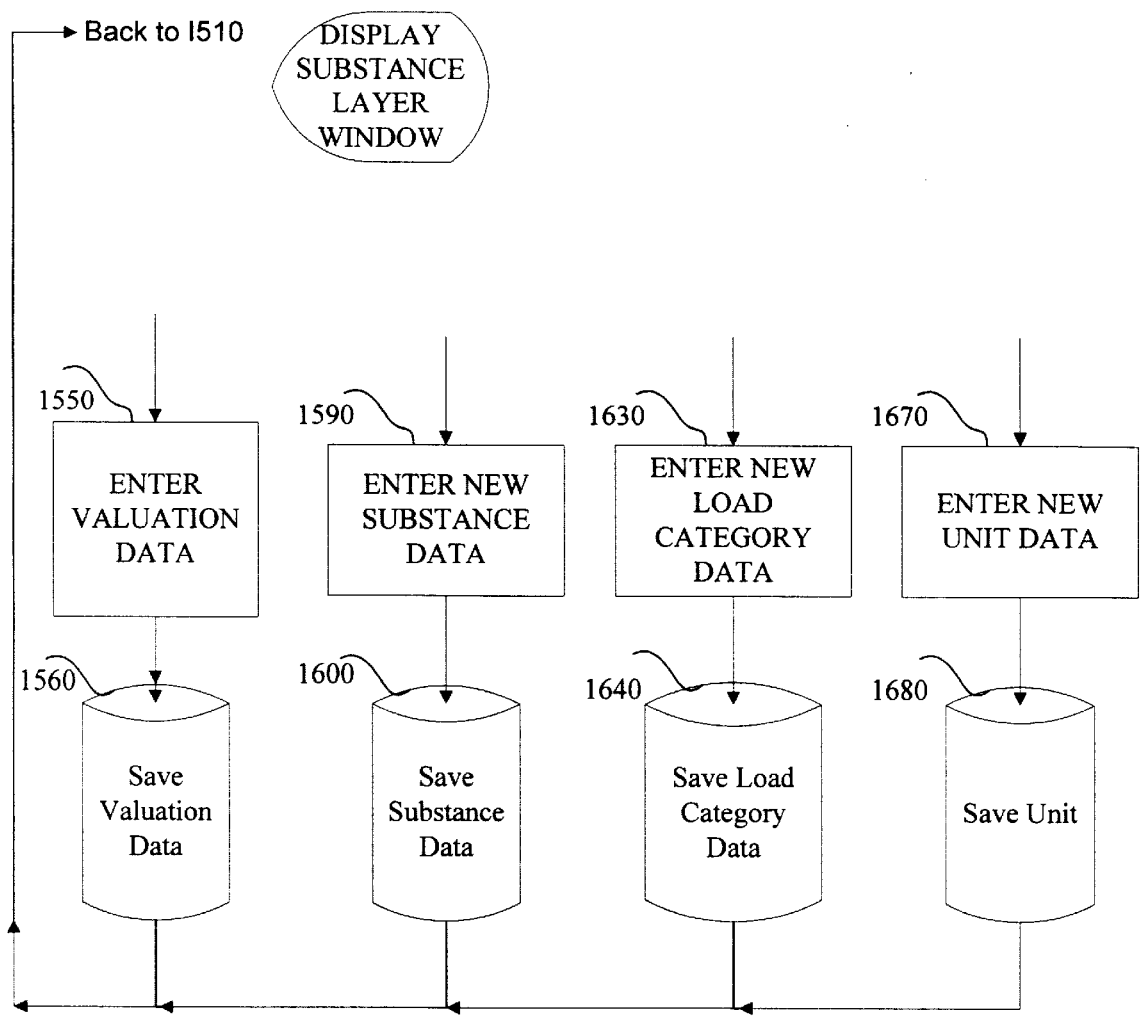

FIG. 19 is a flowchart for The Substance Layer and relational database Entry Point for the Inventory Stage (I), at entry point, C, 140. First the substance data is retrieved, 1500, then the substance layer window is displayed, 1510. Next a decision is required regarding updating the substance data, 1520. If no updating is required, return to the main menu, 330, If updating is required, another decision is made regarding new valuation schemes, 1530. If a new valuation scheme is desired, then the new valuation method window is displayed, 1540. Next, enter the valuation data from the new valuation method window, 1550. The valuation data is saved, 1560, then automatically return to 1510, the substance layer window.

If no new valuation scheme is desired, then enter a new substance to the relational database, 1570. If a new substance is entered, 1580, the new substance window is displayed. Then enter the new substance data, 1590. Next, save the new substance data, 1600, automatically returning to 1510. If no new substance is entered the option remains to add a new load category, 1610. Then if a new load category is desired, 1610, the new load category window is displayed. Enter the new load category data, 1630 and then the data is saved, 1640, automatically returning to 1510, the substance layer window. If no new load category is added, then a decision about adding a new unit is possible, 1650. If a new unit is added, then the new unit window is displayed, 1660. Then the new unit data is entered, 1670 and then the unit data is saved, 1680 and return automatically to 1510.

If the decision is not to perform any of the preceding steps, 1650, in Substance Layer Entry Point process flow, then simply return to the main menu, 330.

Figure 20:
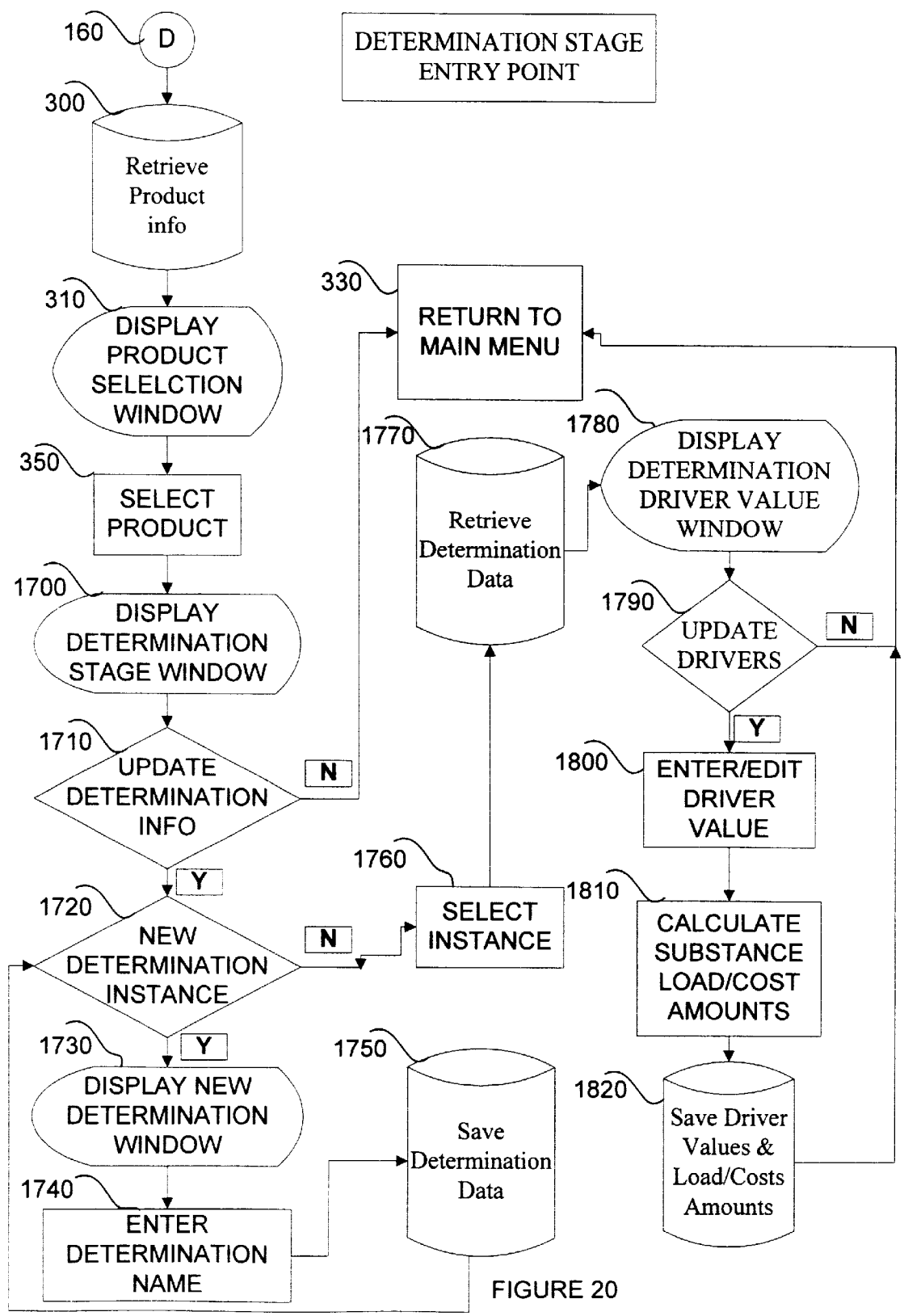
FIG. 20 is a flowchart describing how to use the Determination stage (II) Entry Point of the LCAPIX module software. The flowchart shows first, retrieval of the product information from the relational database is required and then display of the product selection window occurs. Next, select the product, then the Determination window is displayed automatically. The first Determination stage (II) decision branch option is for either updating the determination stage information or not returning to the main menu. If the option of updating the determination stage is chosen, then two branches are again available. If a new determination instance is chosen the new determination window is displayed. Then the determination name is entered, and the determination data is stored and an automatic return to the Determination Stage window occurs.

FIG. 20 is a flowchart for the Determination Stage (II), at entry point, D, 160. First the product information from the relational database is retrieved 300, and the product selection window is displayed, 310. Next, select the product, 350, then the Determination window is displayed automatically, 1700.

The Determination stage (II) decision branch option, 1710, is to either update the determination stage information 1720 or not returning to the main menu, 330. If the option of updating the determination stage is chosen, 1720, then two branches are again available. If a new determination instance is chosen, 1720, then the new determination window is displayed, 1730. Then the determination name is entered, 1740 and the determination data is stored, 1750 and an automatic return to 1700, the Determination Stage window, occurs.

If no new determination instance is chosen, then the instance is selected 1760, and the determination data is retrieved, 1770. The determination driver value window is then displayed, 1780. Next, another decision branch occurs for updating the driver values, 1790. If the decision is to update the driver values, driver values may be entered or edited, 1800. This is where the load substance value(s) are calculated based upon the algorythm, Driver Factor x Driver Value(s)=Load Substance Amounts, 1810. The Load Substance Amounts are subsequently saved "to" the database, 1820 and automatically return to the Main Menu, 330.

If no update of the driver(s) are desired, then simply return to the main menu, 330.

Figure 21:
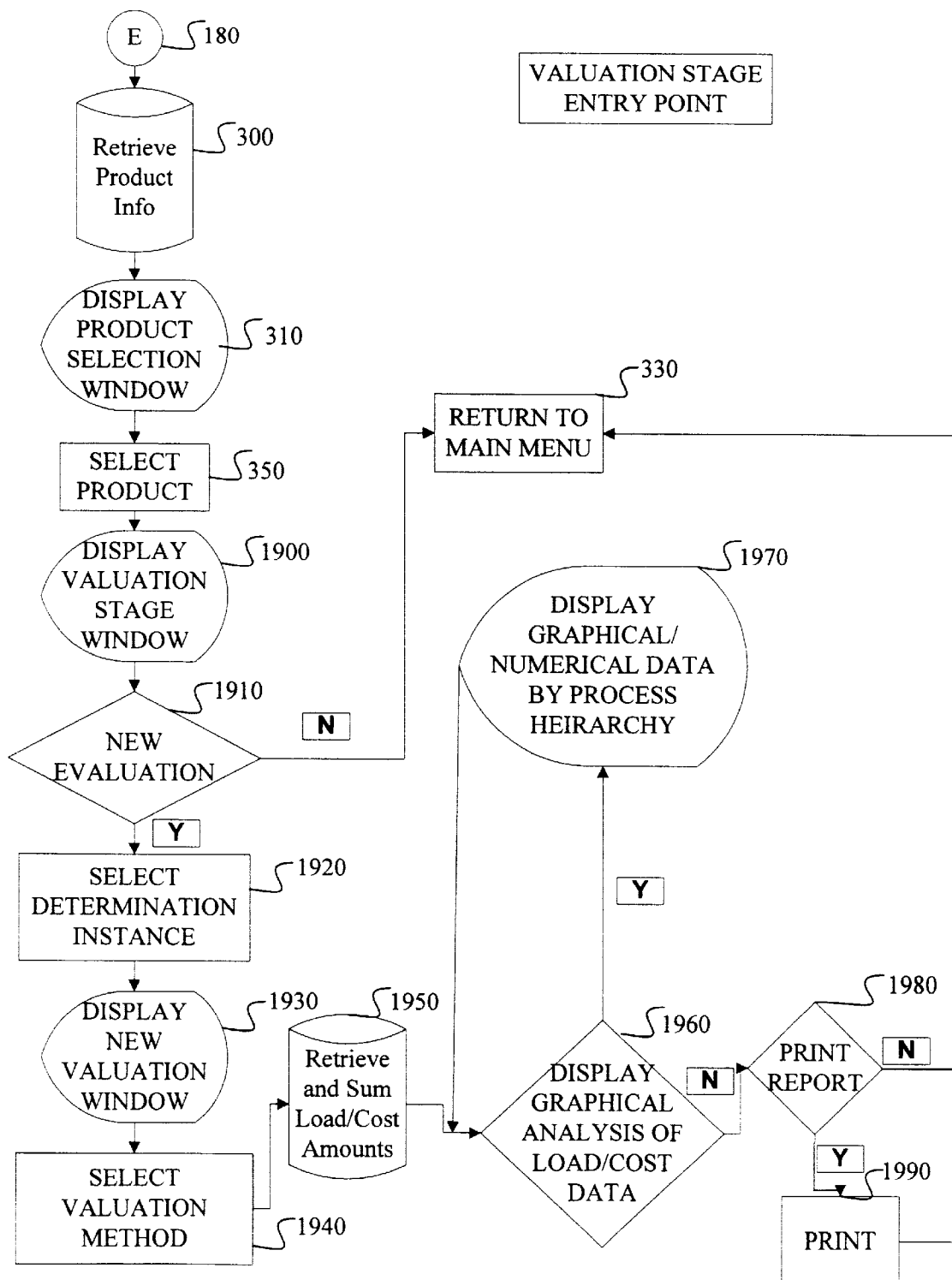
FIG. 21 is the flowchart describing the Valuation Stage Entry Point for the LCAPIX module. The flow indicates that first, the product information is retrieved and then the product selection window is automatically displayed. Next the product is selected and then the valuation stage window is displayed. A decision is mandatory to either perform a new valuation or return to the main menu. If the decision is to perform the valuation (cost or environmental burden basis), the determination instance is selected. Once the determination instance is chosen, the new valuation window is displayed and the valuation method is selected. After selection of the valuation method, the load cost or burden amounts must be retrieved and summed by category. A decision is then required regarding whether or not data display is desired. If the option is to display graphical or numerical data, then the data is displayed. The load cost or burden data can then be displayed by process hierarchy, sequentially or completely. After displaying the data, options for printing the report(s), or exiting to return to the main menu, exist.
Figure 22:
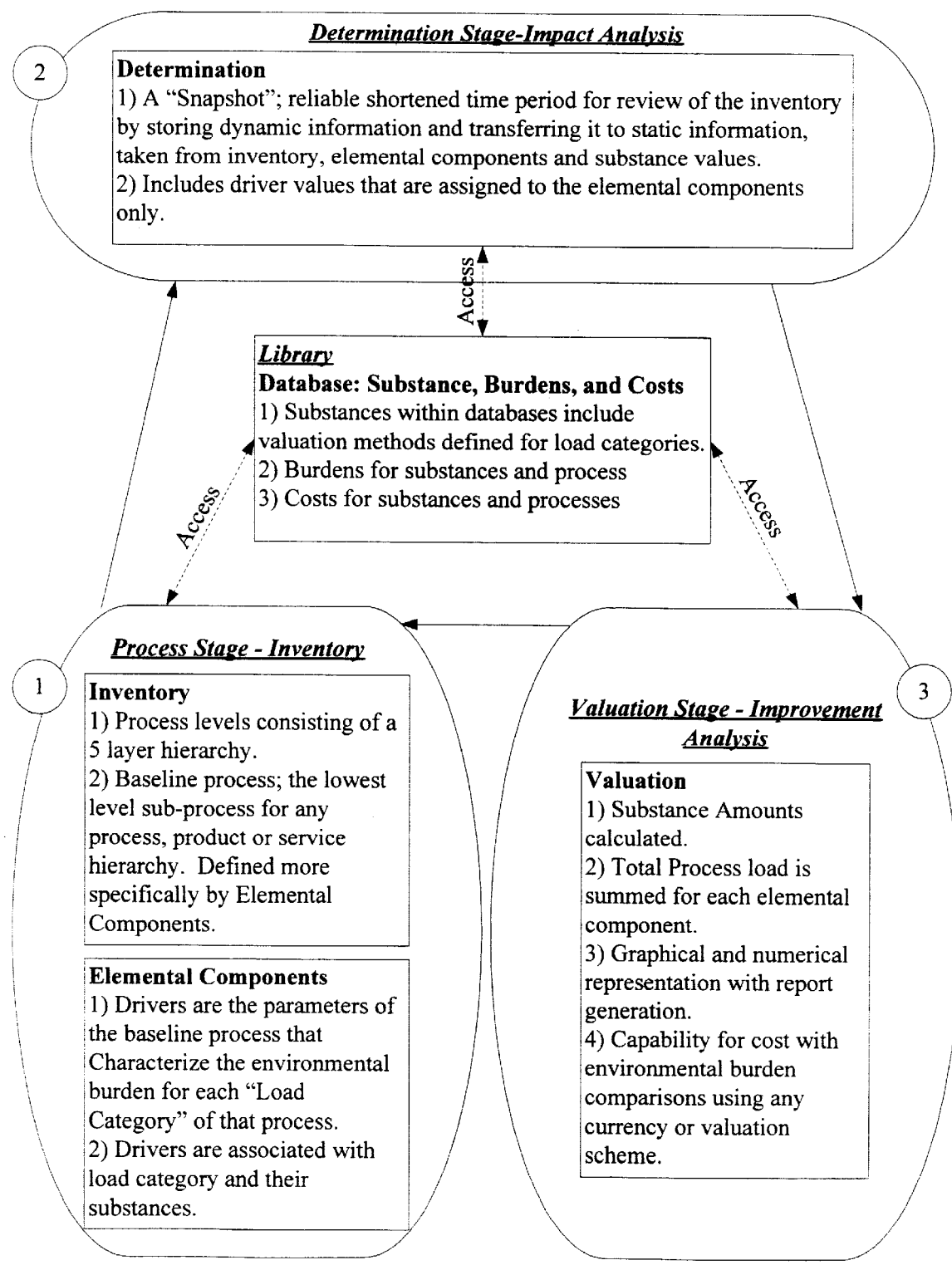
FIG. 22 is a Venn Diagram that illustrates the process flow and procedural steps directly associated with the Overall flowchart of FIG. 8 and is corollary with FIGS. 9–21. In the diagram the lower right hand circle (labeled 1) encompasses the Process Inventory stage requirements and understanding of the elemental components needed to complete this section for the LCAPIX module user. The top circle (labeled 2) includes the Determination Stage requirements for the LCAPIX module. The third circle (labeled 3) on the lower right of the diagram yields an explanation for the Valuation Stage and consequential improvement analysis using LCAPIX.
Figure 23:
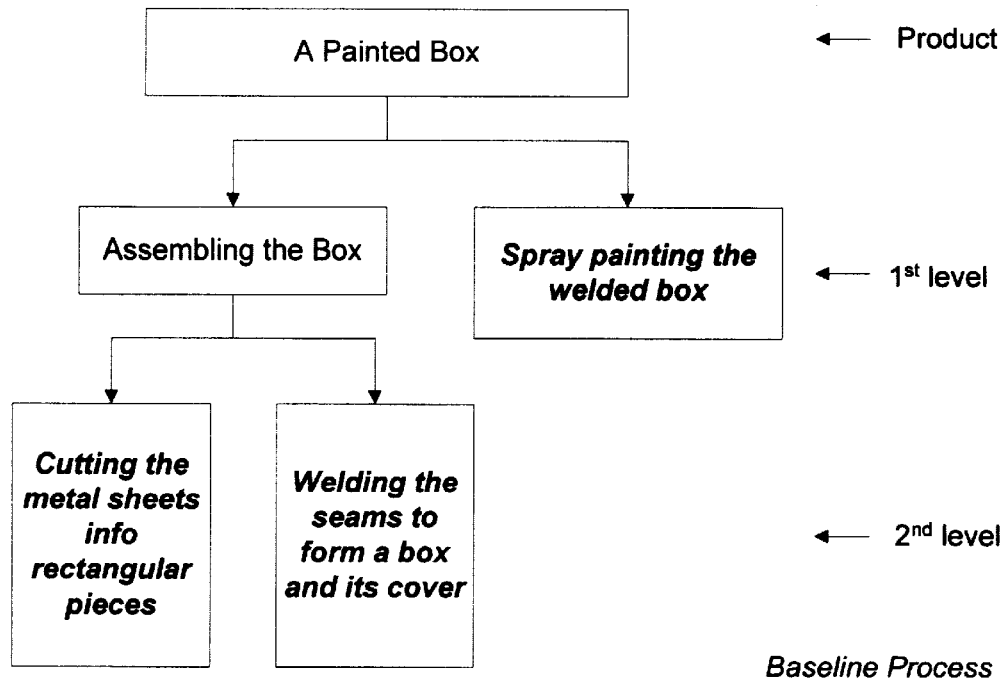
FIG. 23 is a block diagram illustrating the hierarchy for a painted box that is used as the demonstrated Product in the Product/Process Name stage of the LCAPIX module. This diagram also corresponds with the flowchart of FIG. 8. Here the painted box is the product, then there are two processes at the 1st level—assembling the box and spray painting the welded box. At the $2^{nd}$ level, the "assembling the box" process further decomposes into two $2^{nd}$ level processes- "cutting the sheets into rectangular pieces" and "welding the seams to form a box and its cover". There are no further decompositions. The lowest level processes are the Baseline Processes. Hence there are three (3) Baseline Processes— "cutting the metal sheets into rectangular pieces", "welding the seams to form a box and its cover" and "spray painting the welded box". In this example, the $2^{nd}$ level is associated with the baseline level.
Figure 24:
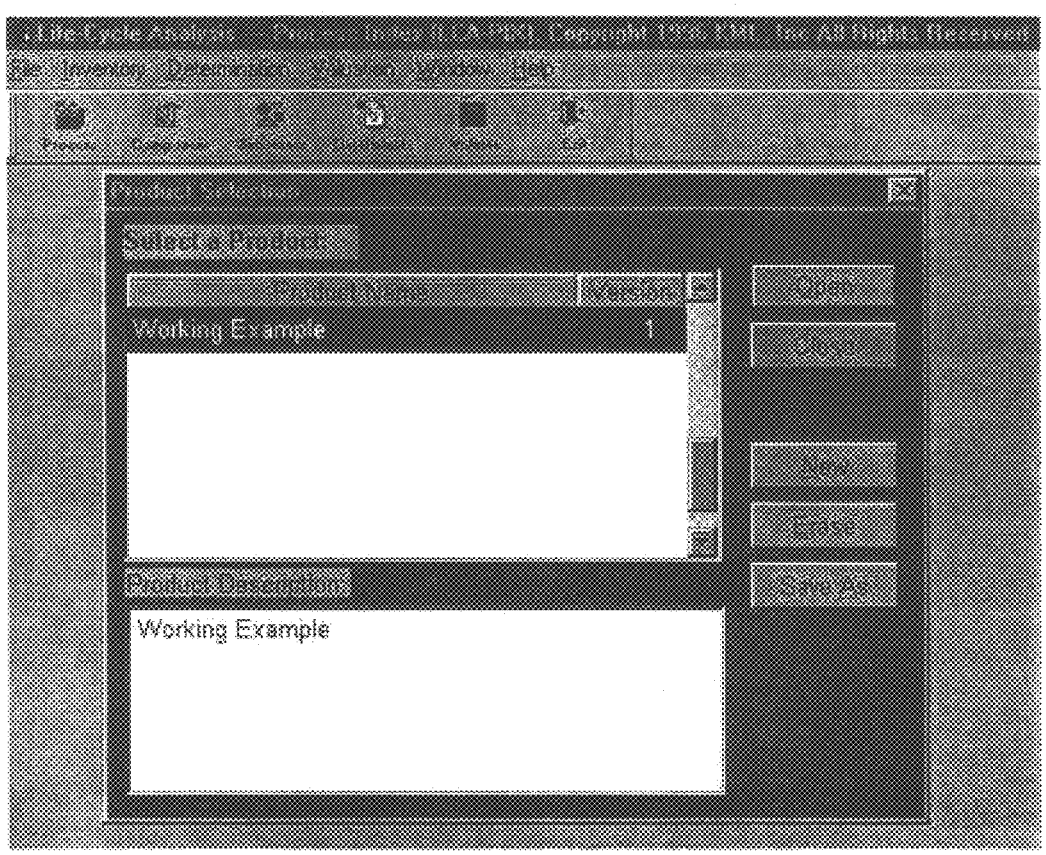
Figure 25:
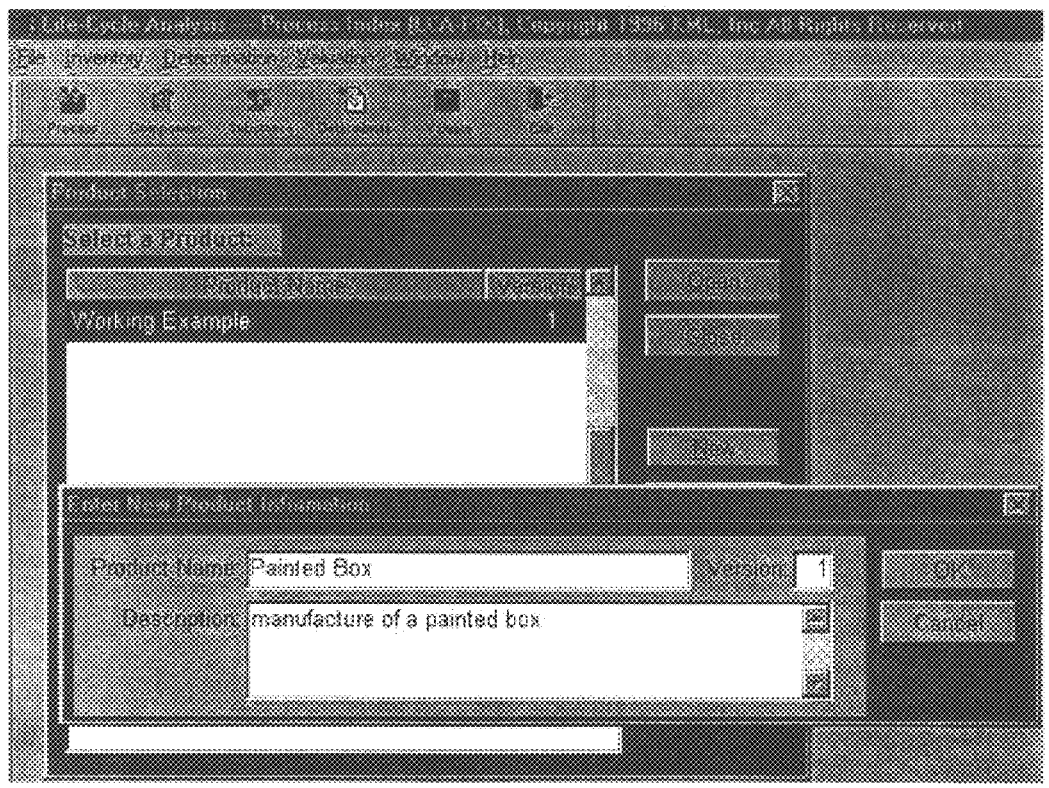
Figure 26:
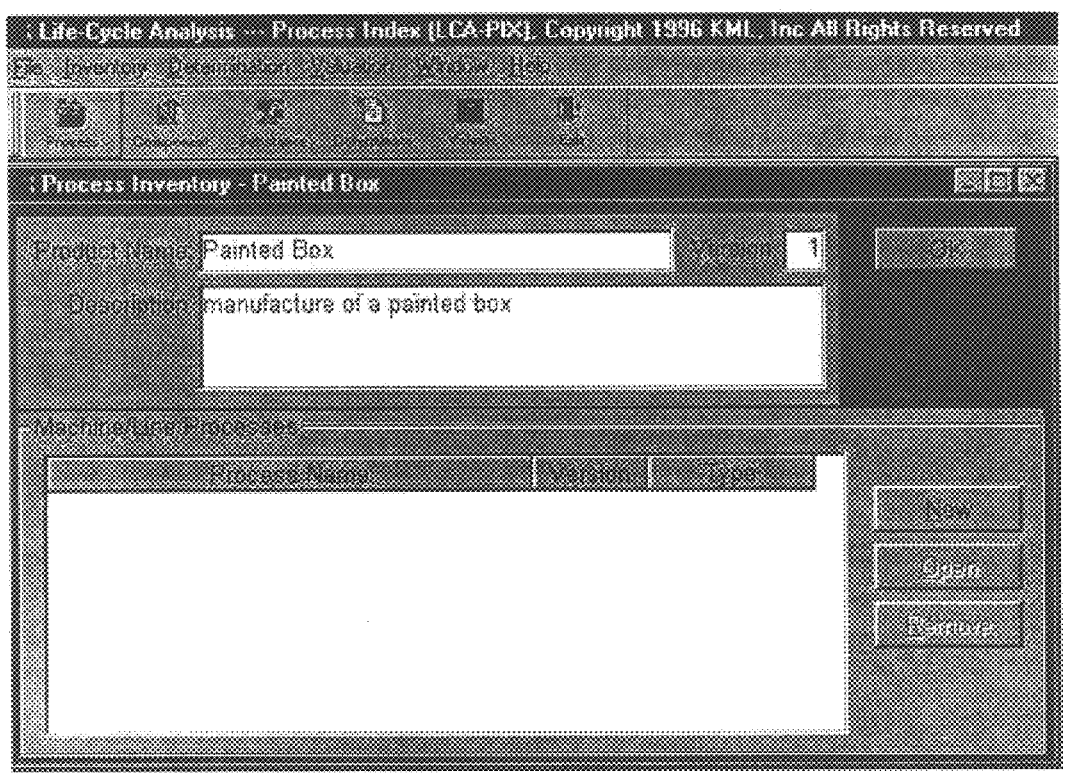
Figure 27:
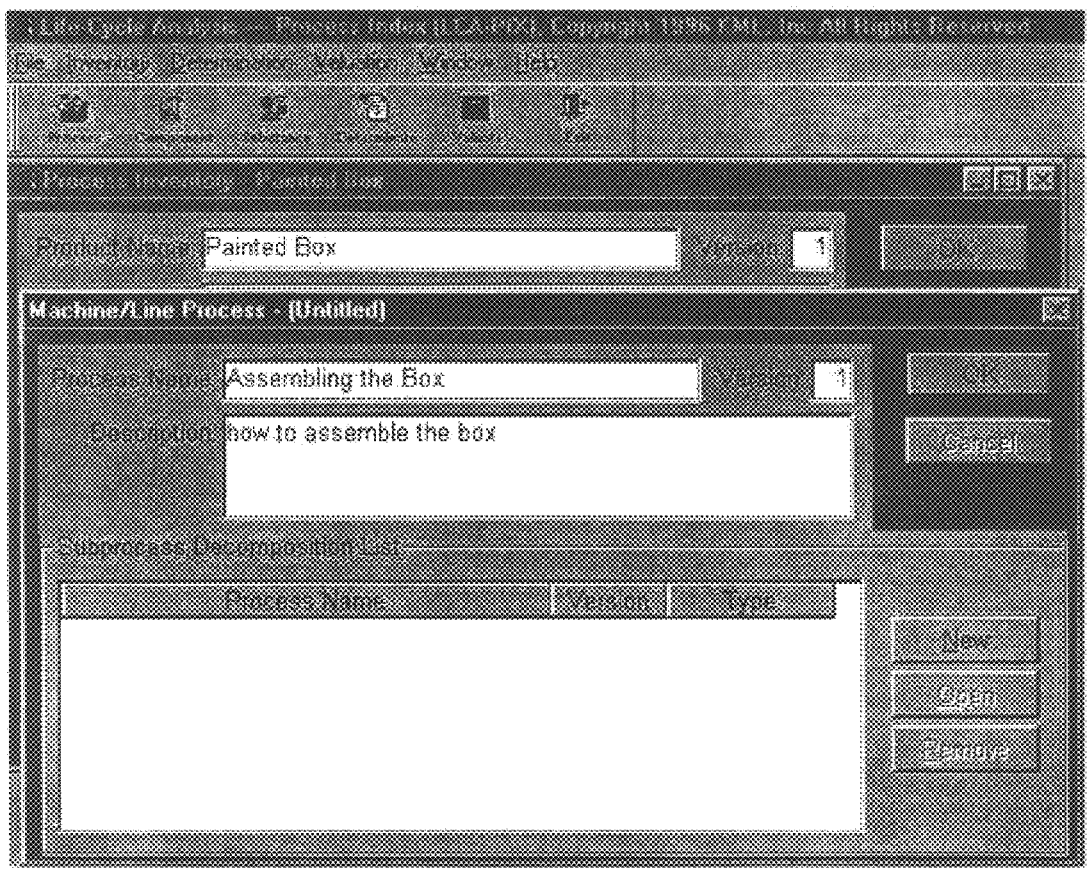
Figure 28:
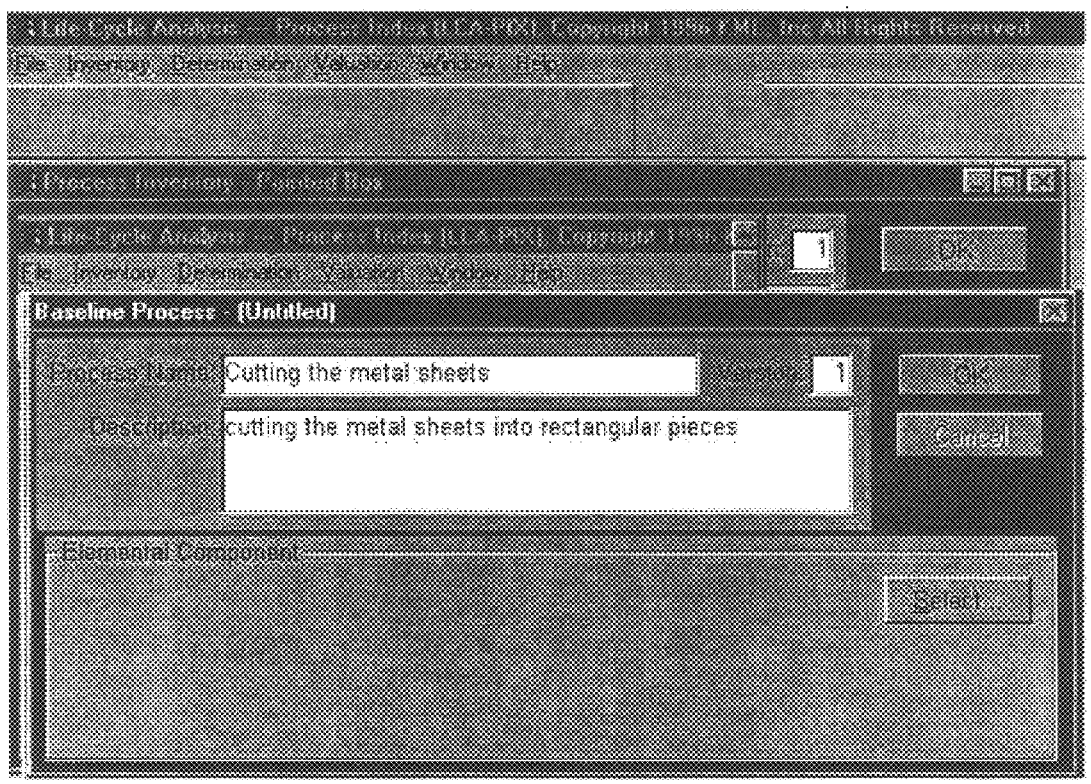
Figure 29:
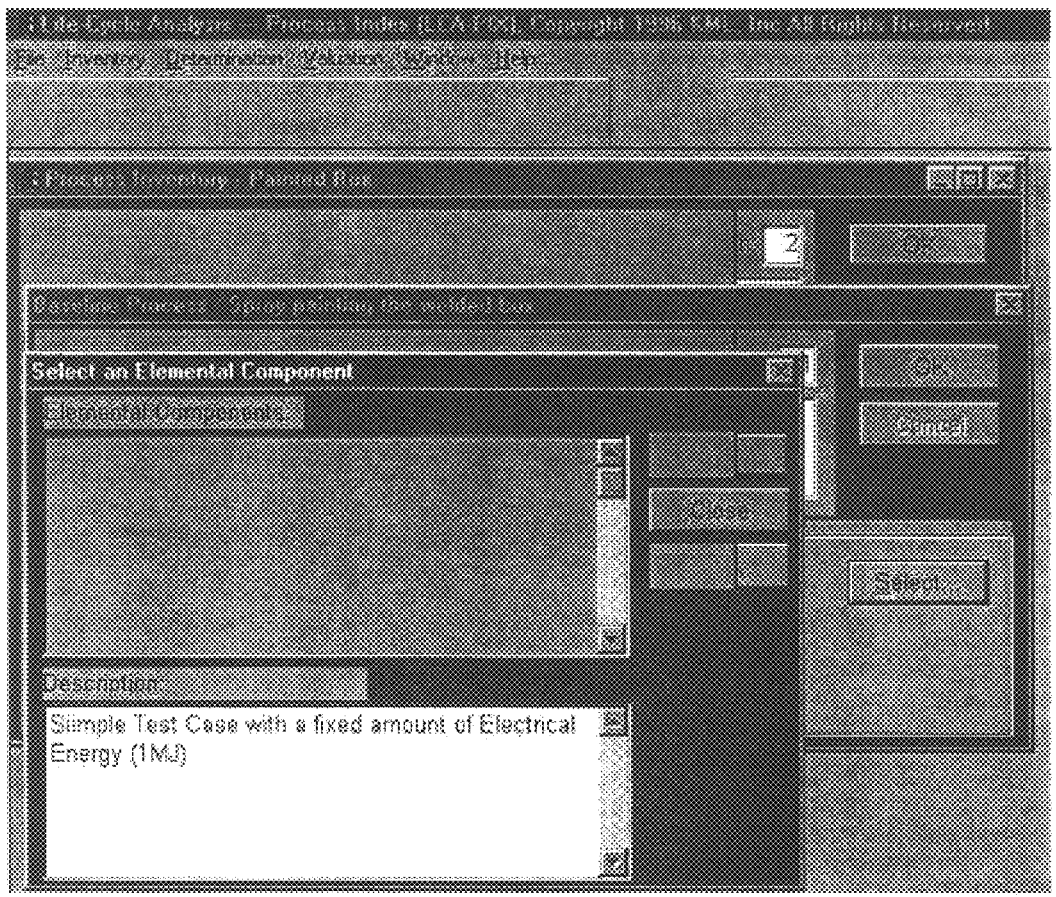
Figure 30:
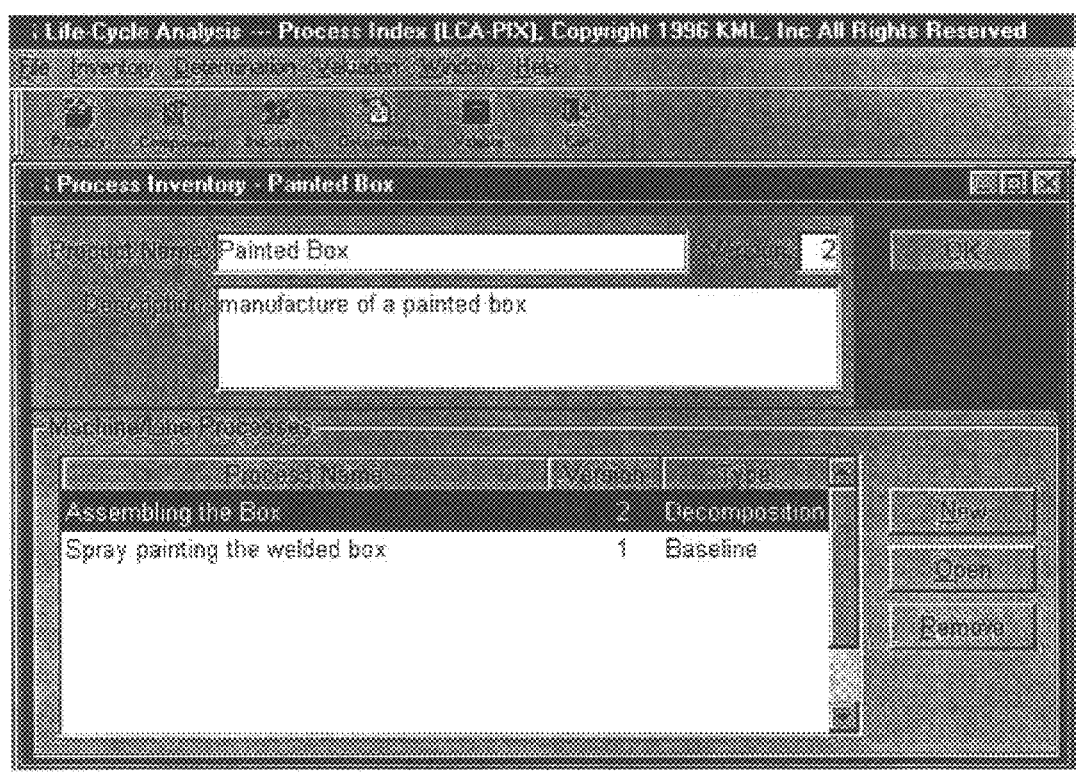
Figure 31:
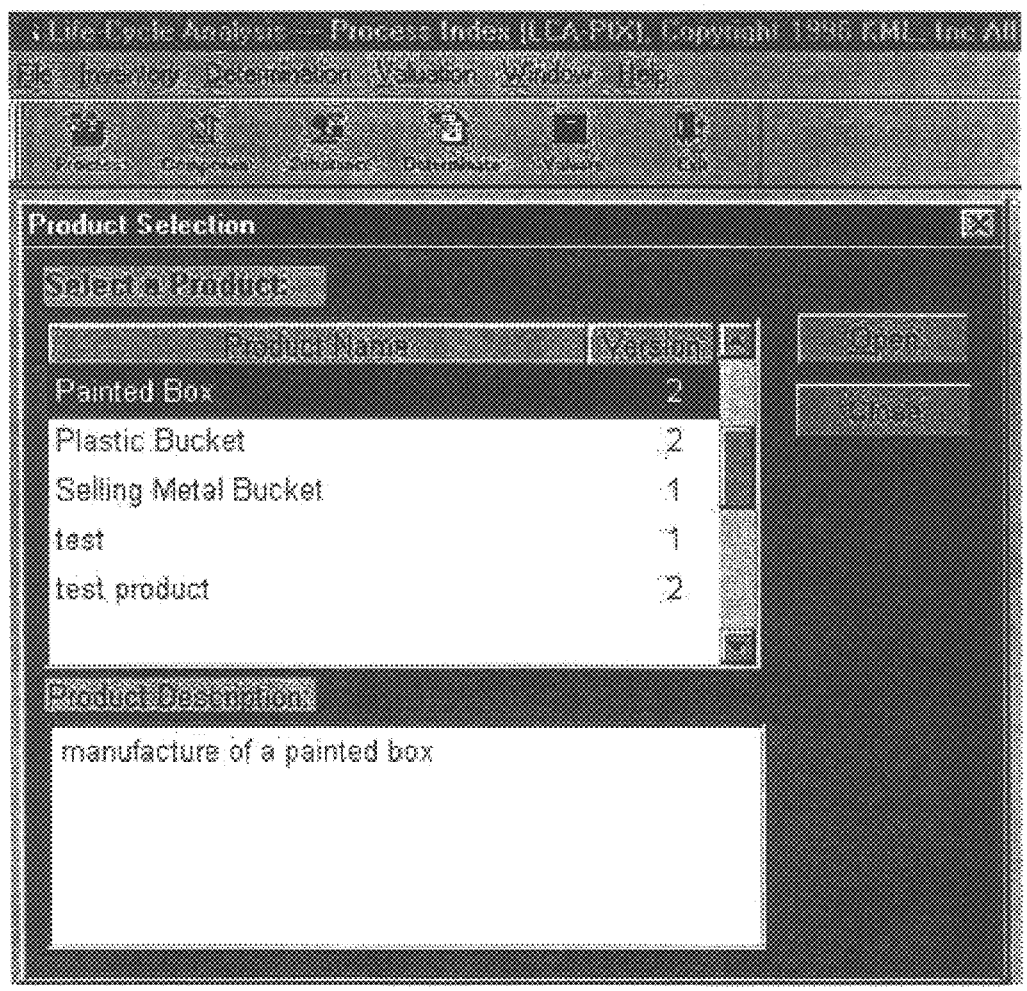
Figure 32:
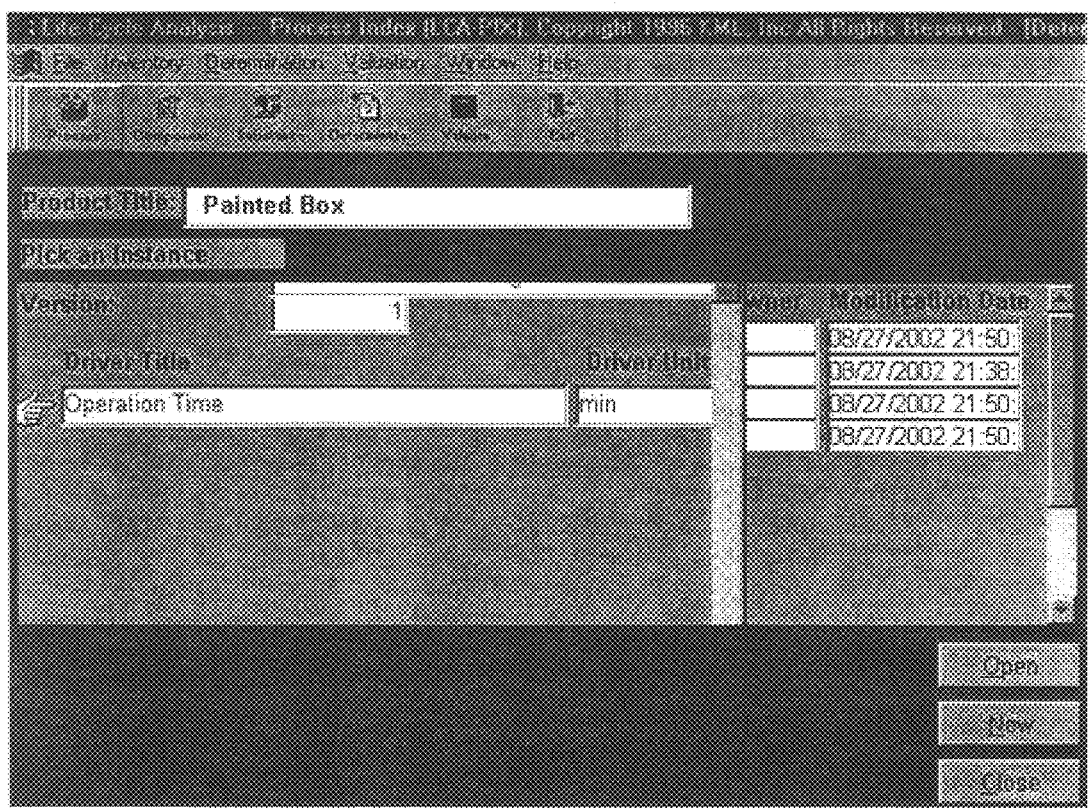
Figure 33:
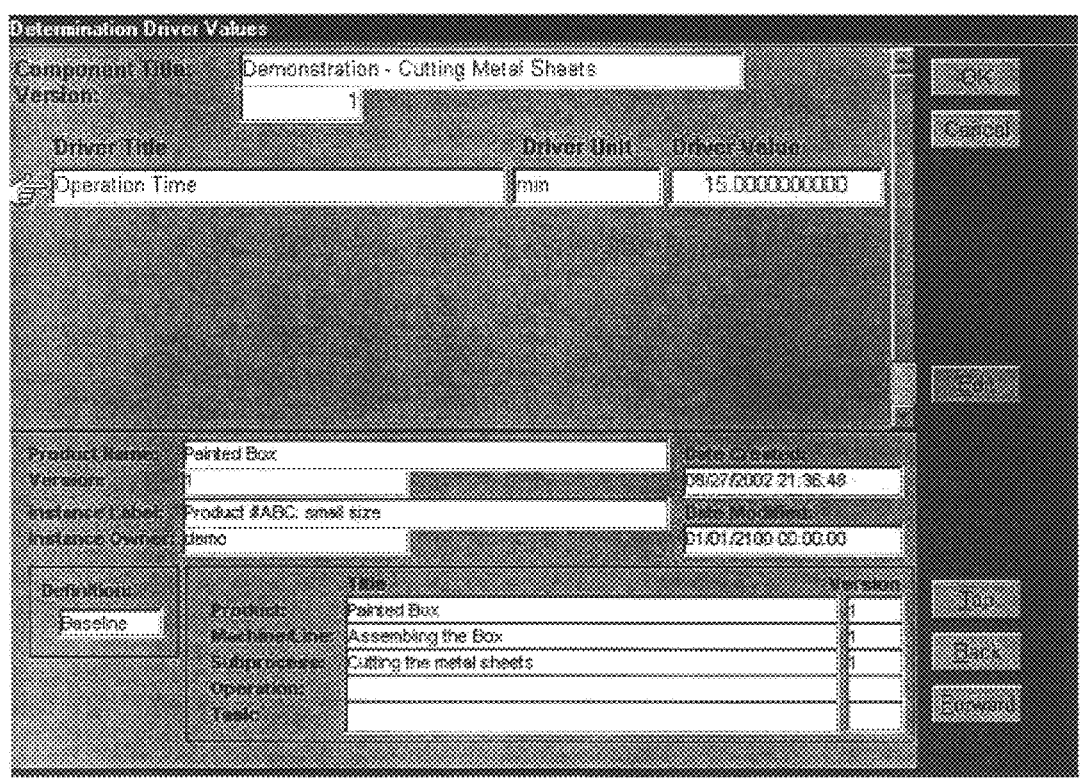
Figure 34:
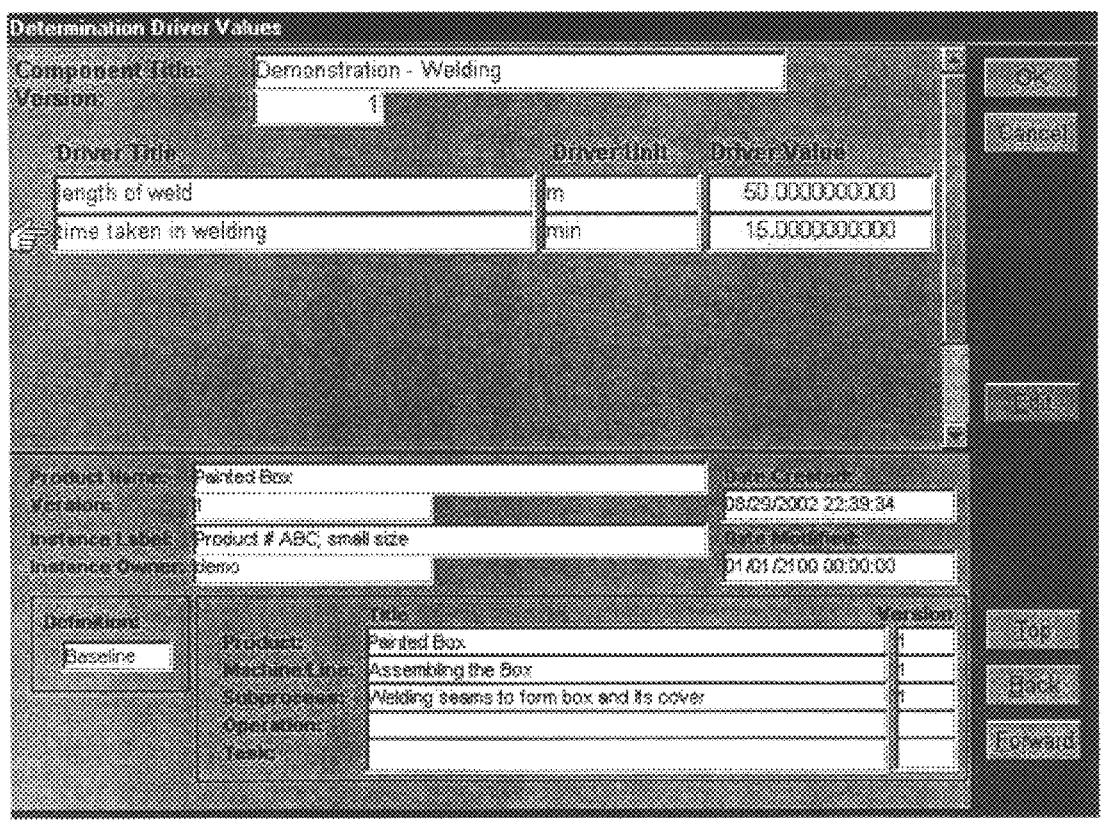
Figure 35:
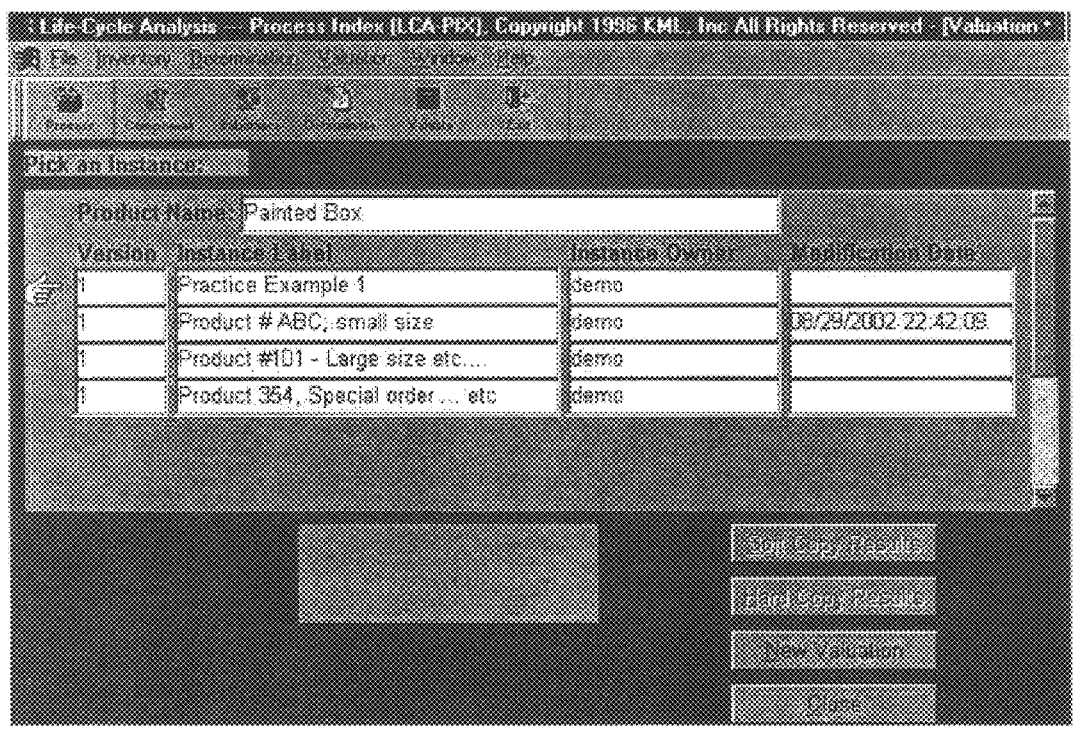
Figure 36:
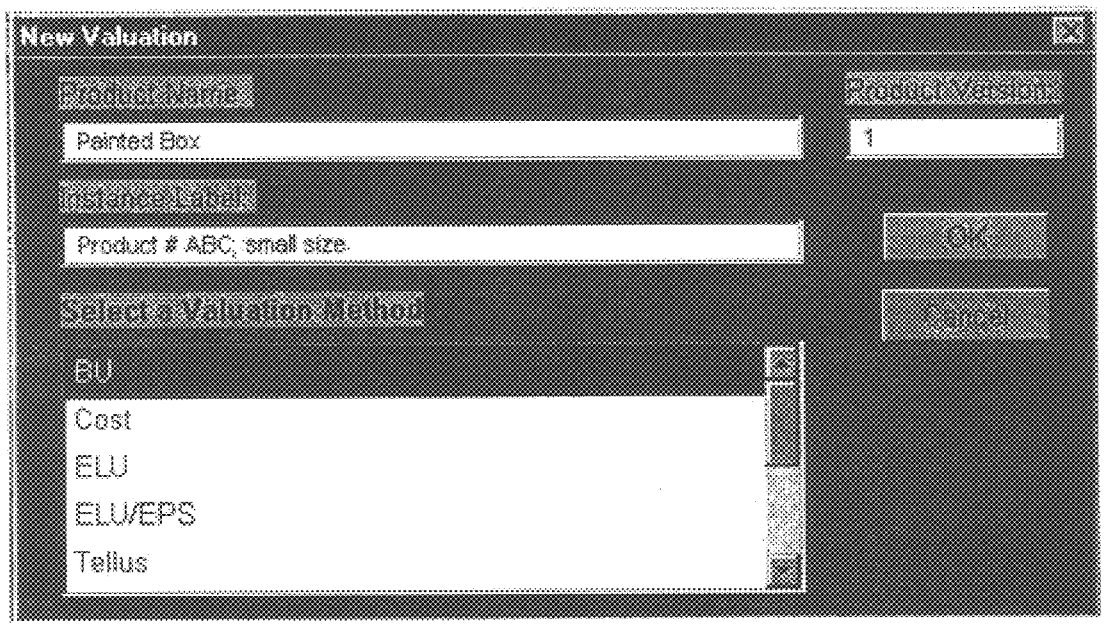
Figure 37:
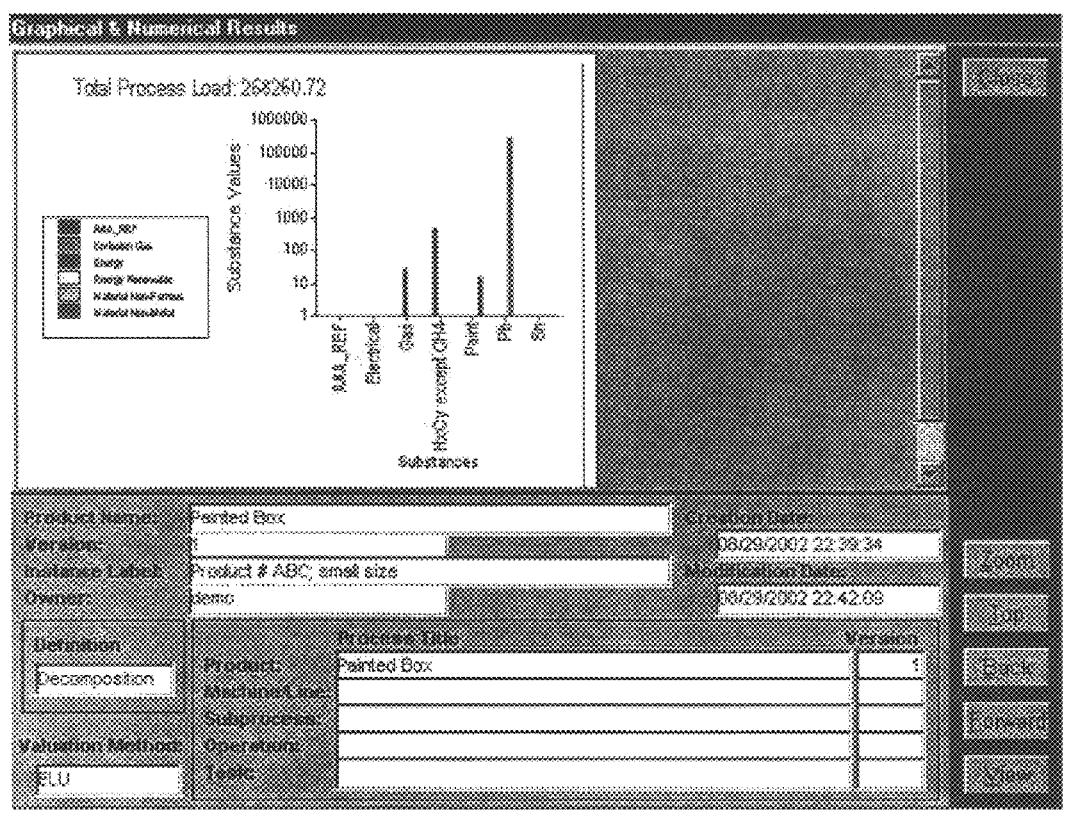
Figure 38:
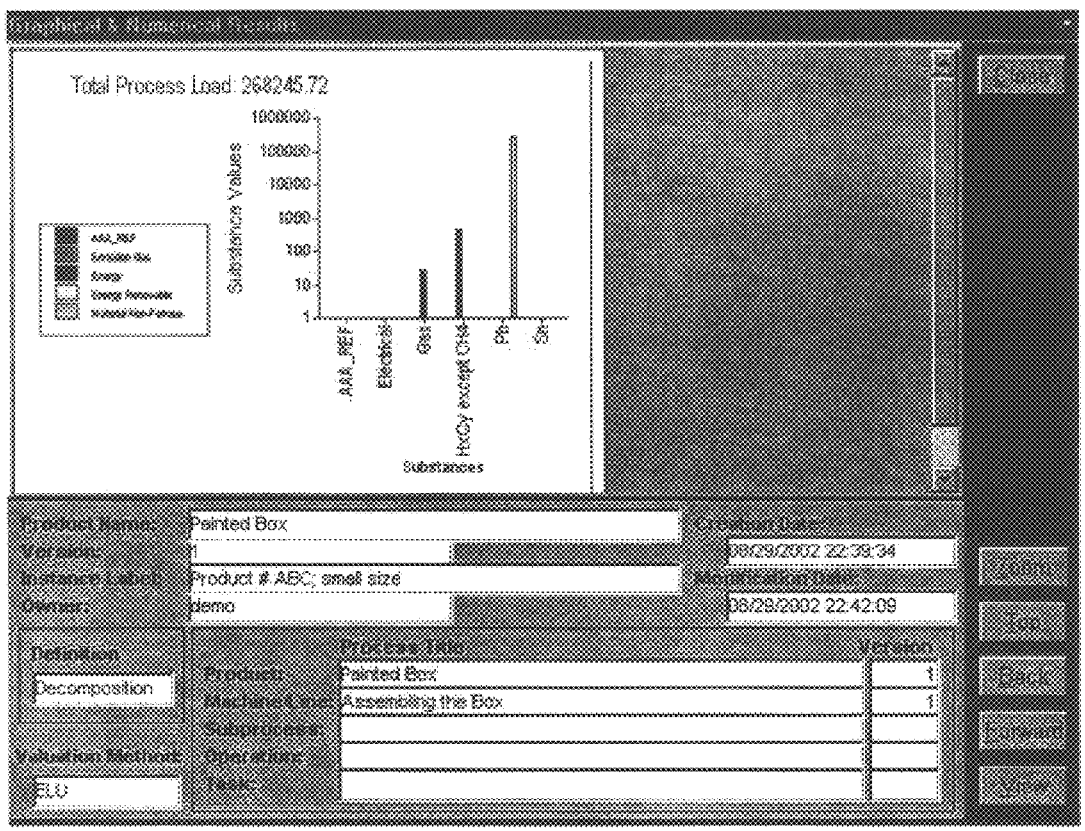
Figure 39:
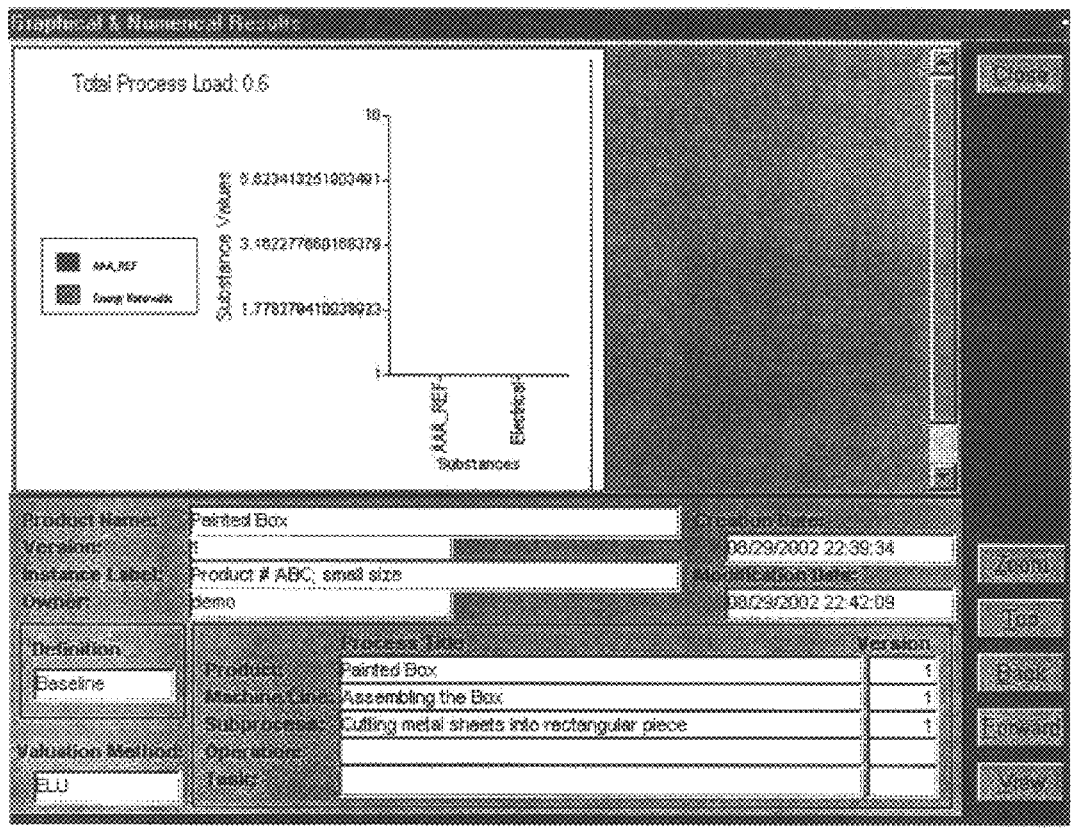

FIG. 21 is the flowchart for the Valuation Stage Entry Point for the LCAPIX module. First, the product information is retrieved, 300, then the product selection window is automatically displayed, 310. Next the product is selected, 350, then the valuation stage window is displayed, 1900. A decision, 1910 to either perform a new valuation or return to the main menu, 330. If the decision is to perform the valuation (cost or environmental burden basis), select the determination instance, 1920. Once the determination instance is chosen, the new valuation window is displayed, 1930 and select the valuation method, 1940.

After selection of the valuation method, the load cost or burden amounts are retrieved and summed by category, 1950. A decision is then required regarding whether or not data display is desired, 1960. If the option is to display graphical or numerical data, then the data is displayed, 1970. The load cost or burden data can be displayed by process hierarchy, sequentially or completely, 1970. This allows for rapid and precise focus on finite portions of the product/process/service under study by LCA/ABC. After displaying the data, options for printing the report(s), 1980, and returning to the Main Menu, 330 or to return to the main menu, 330.

The foregoing explanation describes the logic flow of the software application, LCAPIX and the function it provides.

Figure 42:
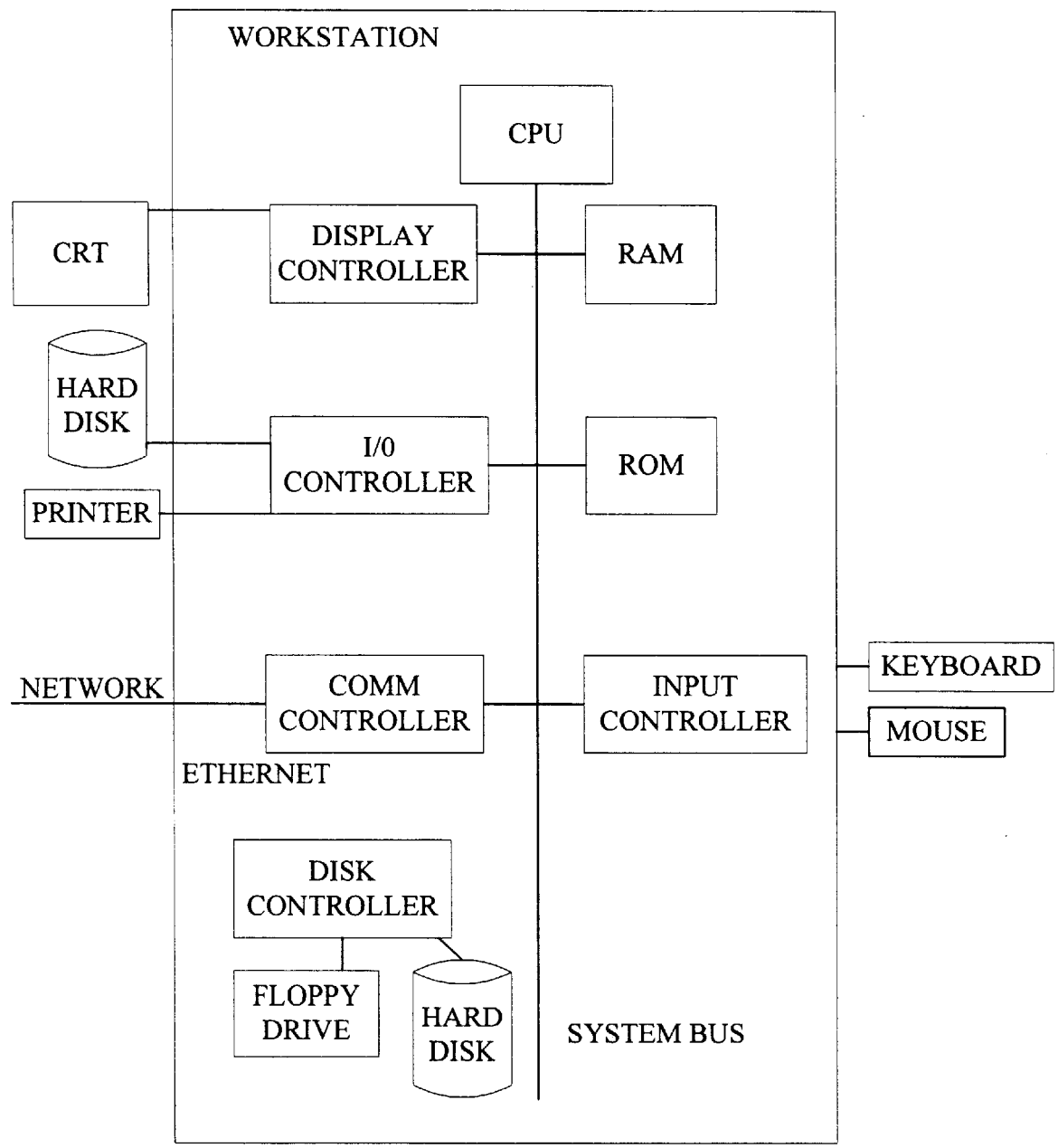
FIG. 42 is a block diagram showing the main hardware components of a computer system, or workstation, which may be used to implement the invetion. The invention is carried out using any computer or microprocessor system which includes standard computer components such as a hard disk drive, a floppy disk drive, an optical disk drive, a RAM, and a ROM for storing computer microcode.

This invention is carried out using any computer or microprocessor system which includes standard computer components such as a hard disk drive, a floppy disk drive, an optical disk drive, a RAM, and a ROM for storing computer microcode. Included herewith is a block diagram of a computer system, or workstation, which may be used to implement the invention shown in FIG. 42. Further the invention may be carried out using a plurality of computers which are networked together in a manner which would be used in comprehensive costing analysis approaches.

Therefore, an embodiment of the present invention is a programmed computer, apparatus, or system which carries out the processes described herein. The apparatus or system has means for carrying out each of the functions. These means may be implemented by, but are not limited to, the components of a computer or programmed computer and the equivalents thereof Further, the invention may be carried out using special purpose circuitry, memories, and integrated circuits. The invention also includes a method for carrying out the processes described herein and more particularly, a computer implemented method for carrying out the process of the invention.

This invention may be conveniently implemented using a conventional general purpose digital computer or microprocessor programmed according to the teachings of the present specification, as will be apparent to those skilled in the computer art. Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium including instructions which can be used to program a computer to perform a process of the invention. The storage medium can include, but is not limited to, any type of disk including floppy disks, hard disks, optical discs, CD-ROMs and magneto-optical disks, ROMs, RAMs, EPROMs, EEPROMs, magnetic or optical cards, or any type of media suitable for storing electronic instructions. Further the invention includes a memory such as any of the memories illustrated or described herein to store the data structures, data, or code or any other electronic information used by the invention.

Further information about the programmed functions of the invention are set forth in the preceding pages which include a description of the programmable software application portion of the invention known as LCAPIX, as shown and described in the flowcharts of FIGS. 8–21.

Minimum hardware requirements for running the LCAPIX system module under a windows operating system include a 486 speed or equivalent processor with 8 MB RAM.

Obviously, numerous modifications and variations of the present invention are possible in light of the above teachings. It is therefore to be understood that within the scope of the appended claims, the invention may be practiced otherwise than as specifically described herein.

What is claimed is:

1. A technical method comprising; combining activity based costing with life cycle assessment for products to analyze data provided for an inventory stage by incorporating a product hierarchy and establishing a system such that performing a determination stage and a valuation stage of said life cycle assessment providing for analysis of environmental load burdens and associated costs for said products can be completed and, whereby said analysis of said products may also be analysis of processes or services.

2. A method according to claim 1, wherein accomplishing said analysis of said environmental load burdens and associated costs without detailed knowledge of either life cycle assessment or activity based costing principals is achieved.

3. A method according to claim 1, wherein accomplishing said life cycle assessment according to ISO 14000 for environmental management systems is followed using an activity based costing approach for analyzing said data.

4. A method according to claim 1, wherein a five level or more or less process from top to bottom including product/process, machine line, subprocess, operation and task levels is used to define said product hierarchy.

5. An object-oriented and data processing system for implementation by a computer in an object-oriented framework comprising a relational or equivalent database for merging life cycle assessment and activity based costing for analyzing and comparing data from products for making objective comparisons in choosing said products, whereby said products may also be processes or services by;

inputting product names to said relational database or selecting said product, from said database comprising a further series of steps of;

building a one level or greater product hierarchy, said hierarchy including product/process, machine line, subprocess, operation, and task levels, associating baseline processes characterized as a terminating process of said hierarchy with elemental components that are measurable events and that are essential parts used in manufacturing said product, carrying out said process, or performing said service, whereby said data and information describing said product is saved in a product table;

building an elemental component library of data wherein elemental component data is retrieved, selected, or updated and defining said product by drivers, wherein said drivers are necessary to describe said elemental components and associating said drivers with measured load substance categories followed by saving said library of data into said relational database;

and wherein repeating said association of load substance categories with elemental component drivers until said hierarchy is complete for said product within said inventory stage is accomplished;

providing, at said determination stage, a determination instance characterized as an moment in time of a relationship between said process hierarchy and said elemental components, naming said determination instance and inputting driver values in order to perform determination stage calculations, allowing for traceable and changeable multiple analysis in a said valuation stage;

calculating load substance amounts by multiplying driver values by driver factors previously defined in said elemental component library and stored in said relational database;

summing said load substance amounts by said product hierarchy level from said relational database;

displaying and analyzing said driver value data by selecting a valuation scheme whereby comparisons can be made between said products based on environmental load burdens and associated costs individually or together at the same time or at different times;

reporting said valuation comparisons by generating graphical or numerical reports from values that are summed for environmental burdens and associated costs based on each elemental component of each hierarchical level that has been stored; and;

displaying graphical/numerical data by each stage of said product hierarchy or by an aggregate set of hierarchical stages that comprise said product.

6. The method as recited in claim 5, further comprising the step of;

calculating many cases for many products using said life cycle assessment merged with activity based costing approach, for rapid strategic, and dynamic comparisons using said displayed graphical/numerical data, whereby said products may also be processes or services.

7. A software product comprising the method or an equivalent method of claim 5 to be performed, and contained within said software product a programmed version of said method, that is available to a user and that is stored by any means such as a CD ROM or diskette, to provide for ease of use interface with display windows, pop-up screens, and automatic queries, and the like, so that data entry is easily accomplished and wherein funtions for assessing costs and environmental burdens of new or existing products to be analyzed, using valuation schemes and currency databases allows for ensuring future efficiency and profitability of said products to be analyzed, and whereby said products to be analyzed may also be processes or services and whereby rapid, dynamic and strategic comparisons of said products to be analyzed are achieved.

8. A computer-assisted method for performing both life cycle assessment and activity based costing for at least one product, process or service, the method comprising the steps of:

representing said at least one product, process or service as a process hierarchy comprising at least one elemental component having at least one baseline process associated therewith;

associating at least one driver corresponding to said at least one elemental component, with at least one environmental load/substance category;

calculating a first metric reflective of an environmental load of providing said at least one product, process or service; and calculating a second metric reflective of a cost of providing said at least one product, process or service.

9. The computer-assisted method according to claim 8, further comprising the step of outputing environmental load information for said at least one product, process or service as a plurality of stages associated with the process hierarchy for that at least one product, process or service.

10. The computer-assisted method according to claim 8, further comprising the step of outputing both environmental load information and cost information associated with providing said at least one product, process or service.

11. The computer-assisted method according to claim 8, further comprising the steps of:

receiving first information sufficient to identify at least one product, process or service; and receiving second information reflective of a time frame in which said at least product, process or service is to be provided; wherein said first and second information is received via a graphic user interface.

12. A computer-readable storage medium having executable software code stored thereon, the code including:

code to represent at least one product, process or service as a process hierarchy comprising at least one elemental component having at least one baseline process associated therewith;

code to associate at least one driver corresponding to said at least one elemental component, with at least one environmental load/substance category;

code to calculate a first metric reflective of an environmental load of providing said at least one product, process or service; and code to calculate a second metric reflective of a cost of providing said at least one product, process or service.

13. The computer-readable storage medium according to claim 12, further comprising:

code to output environmental load information for said at least one product, process or service as a plurality of stages associated with the process hierarchy for that at least one product, process or service.

14. The computer-readable storage medium according to claim 12, further comprising:

code to output environmental load information; and code to output cost information.

15. A computer-assisted method for performing both life cycle assessment and activity based costing for at least one product, process or service, the method comprising the steps of:

receiving first information sufficient to identify at least one product, process or service;

receiving second information reflective of a time frame in which said at least product, process or service is to be provided;

in response to at least one of said first and second information, retrieving from a database, information reflective of types of supplies required to provide said at least one product, process or service, determining amounts of supplies required to provide said at least one product, process or service; and outputing third information reflective of at least one of said environmental load information and cost information associated with providing said at least one product, process or service.

16. The computer-assisted method according to claim 15, wherein at least a portion of the third information is output as a plurality of stages associated with a process hierarchy for that at least one product, process or service.

17. The computer-assisted method according to claim 15, wherein the step of outputing third information comprises outputing both environmental load information and cost information.

18. The computer-assisted method according to claim 15, wherein the third information is output in both graphical and numerical form.

19. A computer-readable storage medium having executable software code stored thereon, the code including:

code to receive first information sufficient to identify at least one product, process or service;

code to receive second information reflective of a time frame in which said at least product, process or service is to be provided;

code to retrieve, from a database, information reflective of types of supplies required to provide said at least one product, process or service, code to determine amounts of supplies required to provide said at least one product, process or service; and code to output third information reflective of at least one of said environmental load information and cost information associated with providing said at least one product, process or service.

20. The computer-readable storage medium according to claim 19, wherein the code to output comprises code to output at least a portion of the third information as a plurality of stages associated with a process hierarchy for that at least one product, process or service.

21. The computer-readable storage medium according to claim 19, wherein the code to output comprises code to output both environmental load information and cost information.

22. The computer-readable storage medium according to claim 19, wherein the code to output comprises code to output the third information in both graphical and numerical form.

23. A computer-assisted method for performing both life cycle assessment and activity based costing for at least one product, process or service, the method comprising the steps of:

receiving first information sufficient to identify an item comprising a product, process or service;

determining whether said item is included in a database;

if the item is included in the database, determining whether a process hierarchy for that item exists;

if the process hierarchy for that item exists, determining whether baseline processes are associated with at least one elemental component;

if the baseline processes are associated with at least one elemental component, determining whether the at least one elemental component is associated with load substance categories;

if the at least one elemental component is associated with load substance categories, determining whether a corresponding substance is present in a database;

if the corresponding substance is present in a database, determining whether corresponding driver values have been associated with said corresponding substance; and if the driver values have been associated with said corresponding substance, calculating at least one of:

a first metric reflective of the environmental load of providing said at least one product, process or service, and a second metric reflective of a cost of providing said at least one product, process or service.

24. The computer-assisted method according to claim 23, further comprising the step of outputting environmental load information for said item as a plurality of stages associated with the process hierarchy for that item.

25. The computer-assisted method according to claim 23, further comprising the step of outputting both environmental load information and cost information associated with providing said item.

26. The computer-assisted method according to claim 23, further comprising the step of outputting at least one of said first metric and said second metric in both graphical and numerical form.

27. A computer-readable storage medium having executable software code stored thereon, the code including:

code to receive first information sufficient to identify an item comprising a product, process or service;

code to determine whether said item is included in a database;

code to determine whether a process hierarchy for that item exists;

code to determine whether baseline processes are associated with at least one elemental component;

code to determine whether the at least one elemental component is associated with load substance categories;

code to determine whether a corresponding substance is present in a database;

code to determine whether corresponding driver values have been associated with said corresponding substance;

code to calculate a first metric reflective of the environmental load of providing said item; and code to calculate a second metric reflective of the cost of providing said item.

28. The computer-readable storage medium according to claim 27, further comprising code to output environmental load information for said item as a plurality of stages associated with the process hierarchy for that item.

29. The computer-readable storage medium according to claim 27, further comprising code to output both environmental load information and cost information associated with providing said item.

30. The computer-readable storage medium according to claim 27, further comprising code to output at least one of the first and second metrics in both graphical and numerical form.

* * * * *